US011638869B2

(12) United States Patent
Gotoh et al.

(10) Patent No.: US 11,638,869 B2
(45) Date of Patent: May 2, 2023

(54) INFORMATION PROCESSING DEVICE AND INFORMATION PROCESSING METHOD

(71) Applicant: SONY CORPORATION, Tokyo (JP)

(72) Inventors: Tomohiko Gotoh, Kanagawa (JP); Daisuke Mochizuki, Chiba (JP)

(73) Assignee: SONY CORPORATION, Tokyo (JP)

( * ) Notice: Subject to any disclaimer, the term of this patent is extended or adjusted under 35 U.S.C. 154(b) by 390 days.

(21) Appl. No.: 16/489,963

(22) PCT Filed: Mar. 22, 2018

(86) PCT No.: PCT/JP2018/011250
§ 371 (c)(1),
(2) Date: Aug. 29, 2019

(87) PCT Pub. No.: WO2018/186178
PCT Pub. Date: Oct. 11, 2018

(65) Prior Publication Data
US 2020/0230494 A1  Jul. 23, 2020

(30) Foreign Application Priority Data

Apr. 4, 2017  (JP) .............................. JP2017-074395

(51) Int. Cl.
*A63F 13/216* (2014.01)
*A63F 13/215* (2014.01)
(Continued)

(52) U.S. Cl.
CPC .......... *A63F 13/215* (2014.09); *A63F 13/216* (2014.09); *A63F 13/48* (2014.09); *A63F 13/52* (2014.09); *A63F 13/55* (2014.09)

(58) Field of Classification Search
None
See application file for complete search history.

(56) References Cited

U.S. PATENT DOCUMENTS 6,285,924 B1 * 9/2001 Okamoto ........... G01C 21/3661
701/1
6,401,029 B1  6/2002 Kubota et al.
(Continued)

FOREIGN PATENT DOCUMENTS

JP   2000-266551 A    9/2000
JP   2001-308778 A   11/2001
(Continued)

OTHER PUBLICATIONS

International Search Report and Written Opinion of PCT Application No. PCT/JP2018/011250, dated Jun. 26, 2018, 10 pages of ISRWO.

*Primary Examiner* — Tramar Harper
(74) *Attorney, Agent, or Firm* — Chip Law Group

(57) ABSTRACT

The present technology relates to an information processing device, an information processing method, and a program that enable a user to be entertained. The information processing device includes: a first providing unit that provides first information for guiding to a destination in a form of dialogues with the user; and a second providing unit that provides second information regarding a present location in the form of dialogues with the user. The information processing device performs a process while switching among an intro mode as a mode at start of a game, a walk mode in which to walk to a final destination, and an arrival mode in which to arrive at the final destination. The present technology can be applied to, for example, an information processing device with which the user advances a game while talking with a virtual character.

11 Claims, 17 Drawing Sheets

(51) Int. Cl.
*A63F 13/48* (2014.01)
*A63F 13/52* (2014.01)
*A63F 13/55* (2014.01)

(56) References Cited

U.S. PATENT DOCUMENTS

| | | | | |
|---|---|---|---|---|
| 6,446,002 | B1* | 9/2002 | Barton | G01C 21/3629 |
| | | | | 340/988 |
| 6,773,344 | B1* | 8/2004 | Gabai | A63H 30/04 |
| | | | | 463/1 |
| 9,311,802 | B1* | 4/2016 | Chin | G08B 21/02 |
| 2002/0090985 | A1* | 7/2002 | Tochner | A63F 13/655 |
| | | | | 463/9 |
| 2003/0144047 | A1* | 7/2003 | Sprogis | G01S 5/0072 |
| | | | | 463/9 |
| 2004/0002843 | A1* | 1/2004 | Robarts | A63F 13/10 |
| | | | | 703/13 |
| 2004/0164897 | A1* | 8/2004 | Treadwell | G01C 21/20 |
| | | | | 342/358 |
| 2007/0087828 | A1* | 4/2007 | Robertson | A63F 13/12 |
| | | | | 463/7 |
| 2009/0281723 | A1* | 11/2009 | Kurata | G01C 21/3679 |
| | | | | 701/408 |
| 2010/0057571 | A1* | 3/2010 | Yamamoto | G01C 21/3629 |
| | | | | 705/14.58 |
| 2010/0241524 | A1* | 9/2010 | Rogondino | G06Q 30/0601 |
| | | | | 705/26.1 |
| 2010/0306825 | A1* | 12/2010 | Spivack | G06F 16/9537 |
| | | | | 715/849 |
| 2011/0105092 | A1* | 5/2011 | Felt | H04W 4/021 |
| | | | | 455/414.1 |
| 2011/0137437 | A1* | 6/2011 | Jonsson | G06F 3/167 |
| | | | | 709/217 |
| 2011/0319148 | A1* | 12/2011 | Kinnebrew | A63F 13/65 |
| | | | | 463/43 |
| 2012/0114132 | A1* | 5/2012 | Abrahamsson | H04R 1/1041 |
| | | | | 381/74 |
| 2012/0149395 | A1* | 6/2012 | Azami | A63F 13/44 |
| | | | | 455/456.1 |
| 2012/0231887 | A1* | 9/2012 | Lee | A63F 13/217 |
| | | | | 463/39 |
| 2012/0327257 | A1* | 12/2012 | O'Keefe | H04N 5/772 |
| | | | | 348/222.1 |
| 2013/0066636 | A1* | 3/2013 | Singhal | H04B 1/385 |
| | | | | 381/385 |
| 2014/0080109 | A1* | 3/2014 | Haseltine | A63F 13/40 |
| | | | | 434/308 |
| 2014/0172640 | A1* | 6/2014 | Argue | G06Q 30/0641 |
| | | | | 705/26.61 |
| 2014/0213361 | A1* | 7/2014 | Zhang | A63F 13/332 |
| | | | | 463/31 |
| 2014/0270321 | A1* | 9/2014 | Fullam | H04R 1/028 |
| | | | | 381/387 |
| 2014/0347368 | A1* | 11/2014 | Kishore | G01C 21/20 |
| | | | | 701/538 |
| 2015/0078232 | A1* | 3/2015 | Djinki | H04W 74/02 |
| | | | | 370/312 |
| 2015/0174481 | A1* | 6/2015 | Tobin | A63F 13/65 |
| | | | | 463/7 |
| 2015/0198455 | A1* | 7/2015 | Chen | G01C 21/3623 |
| | | | | 701/428 |
| 2016/0124707 | A1* | 5/2016 | Ermilov | G06F 3/04886 |
| | | | | 345/156 |
| 2016/0367896 | A1 | 12/2016 | Lee et al. | |
| 2017/0329766 | A1* | 11/2017 | Matsuyama | G06F 13/00 |
| 2018/0299289 | A1* | 10/2018 | Hill | H04W 4/48 |
| 2018/0345145 | A1* | 12/2018 | Okajima | G06T 19/003 |
| 2019/0236631 | A1* | 8/2019 | Schwartz | G06F 16/29 |

FOREIGN PATENT DOCUMENTS

| | | |
|---|---|---|
| JP | 2003-305278 A | 10/2003 |
| JP | 2012-215446 A | 11/2012 |
| JP | 2017-503280 A | 1/2017 |
| KR | 10-1479303 B1 | 1/2015 |
| WO | 2015/102243 A1 | 7/2015 |

* cited by examiner

| ID | FREQUENCY | FIRING SUPPRESSION TIME | CONDITION | LINES |
|---|---|---|---|---|
| 001 | TEN MINUTES | THIRTY MINUTES | 13:00 TO 18:00 | (STOMACH RUMBLING) OH, SORRY! MY STOMACH WAS RUMBLING. WHEN'S DINNER? |
| 002 | TEN MINUTES | THIRTY MINUTES | 16:00 TO 4:00 | (YAWN) I'M SLIGHTLY SLEEPY. |
| 003 | FIVE MINUTES | TEN MINUTES | | (STOMACH SOUND) I'M HUNGRY. |
| 004 | FIVE MINUTES | TEN MINUTES | | (SNIFF) AH! I THINK THERE IS CAT NEARBY. |
| 005 | TEN SECONDS | THIRTY SECONDS | ACTION=STANDSTILL | LET'S WALK. WE WILL ARRIVE AT FAMILIAR PLACE. |
| 006 | ZERO | ONE MINUTE | INDOOR | I LOVE TO BE OUTSIDE! SO LET'S GO OUT. |
| 007 | FIVE MINUTES | THIRTY MINUTES | RAINY DAY | MY OWNER WOULD WIPE ME WITH TOWEL WHEN I RAN IN RAIN. |
| 008 | THIRTY SECONDS | THIRTY SECONDS | | BARK 1 |
| 009 | THIRTY SECONDS | THIRTY SECONDS | | BARK 2 |
| 0010 | THIRTY SECONDS | THIRTY SECONDS | | BARK 3 |

| | ID | LINES |
|---|---|---|
| GETTING CLOSE TO DESTINATION | H01 | GO STRAIGHT THIS ROAD. |
| | H02 | I FEEL APPROACHING. LET'S GO ON THIS ROAD. |
| | H03 | HERE, THIS ROAD. |
| GETTING AWAY FROM DESTINATION | C01 | IT LOOKS DIFFERENT SOMEHOW. LET'S GO ON ANOTHER ROAD. |
| | C02 | THIS ROAD IS DIFFERENT. |
| | C03 | I DON'T KNOW THIS ROAD. I WANT TO GO ON ANOTHER ROAD. |
| HERE, HERE! (CALL FROM LEFT) | L01 | (CALL FROM LEFT) HERE, HERE. THIS WAY. |
| | L02 | (CALL FROM LEFT) (SNIFF) SOMETHING GIVES NOSTALGIC SMELL HERE. |
| | L03 | (CALL FROM LEFT) COME HERE. (BARK) |
| HERE, HERE! (CALL FROM RIGHT) | R01 | (CALL FROM RIGHT) HERE, HERE. THIS WAY. |
| | R02 | (CALL FROM RIGHT) (SNIFF) SOMETHING GIVES NOSTALGIC SMELL HERE. |
| | R03 | (CALL FROM RIGHT) COME HERE. (BARK) |

| ID | LINES |
|---|---|
| SL1-01 | THERE ARE LOT OF PEOPLE TODAY! I SAID THAT THIS PLACE IS LIVELY, DIDN'T I? |
| SL1-02 | THERE ARE FEW PEOPLE. DURING DAYTIME, THERE ARE MANY PEOPLE. |
| SL1-03 | LOOK! THERE'S RESTAURANT. WHY DON'T WE GO? (EXCITED BARK) |
| SL1-04 | I'M GOING AHEAD, I WILL WAIT UNDER STAIRS. (SOUND OF RUNNING AWAY) |
| SL1-05 | MY OLD FRIEND MAY BE UNDER STAIRS. |
| SL1-06 | I ENJOYED EATING HERE AND RIDING ON VEHICLES WITH MY OLD FRIEND. WHY DON'T YOU EAT SOMETHING? |
| SL1-07 | OK. ENJOY YOUR MEAL. I WILL BE GOOD WHILE SNIFFING DELICIOUS SMELL. |
| SL1-08 | OK. I LOVE EATING, BUT PEOPLE ARE NOT ALWAYS EATING. |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/011250 filed on Mar. 22, 2018, which claims priority benefit of Japanese Patent Application No. JP 2017-074395 filed in the Japan Patent Office on Apr. 4, 2017. Each of the above-referenced applications is hereby incorporated herein by reference in its entirety.

TECHNICAL FIELD

The present technology relates to an information processing device, an information processing method, and a program, and, for example, to an information processing device, an information processing method, and a program suitable for application to an augmented reality (AR) game and the like.

BACKGROUND ART

With development of information processing and information communication technology, computers are widely spread and actively used for daily life support and entertainment. Recently, computer processing has also been used in the field of entertainment, and such entertainment is not only used by users working in specific places such as offices and homes, but is also required by users on the move.

With regard to entertainment on the move, for example, Patent Document 1 proposes an information processing device that controls interactions of a character displayed on the screen according to the rhythm of a user's body on the move to cause the user to get a feeling of closeness and enjoy the movement itself as entertainment.

CITATION LIST

Patent Documents

Patent Document 1: Japanese Patent Application Laid-Open No. 2003-305278

SUMMARY OF THE INVENTION

Problems to be Solved by the Invention

According to Patent Document 1 described above, however, since the image of the character is displayed on the display screen, entertainment cannot be enjoyed in a case where it is difficult to view the screen while walking or traveling.

Furthermore, it is desired that an information processing device entertain the user more time by providing enjoyments. In addition, it is also desired that the user can enjoy while searching a wide range together with the information processing terminal device.

The present technology has been made in view of such a situation, and enables the user to be entertained.

Solutions to Problems

A first information processing device according to one aspect of the present technology includes a control unit that performs a control to provide destination guidance information for guiding to a destination in a form of voice communication with a user, and performs a control to provide present location related information regarding a present location until the user arrives at the destination according to the destination guidance information in the form of voice communication with the user.

A first information processing method according to one aspect of the present technology includes the steps of: performing a control to provide destination guidance information for guiding to a destination in a form of voice communication with a user; and performing a control to provide present location related information regarding a present location until the user arrives at the destination according to the destination guidance information, in the form of voice communication with the user.

A first program according to one aspect of the present technology causes a computer to a process including the steps of: performing a control to provide destination guidance information for guiding to a destination in a form of voice communication with a user; and performing a control to provide present location related information regarding a present location until the user arrives at the destination according to the destination guidance information, in the form of voice communication with the user.

A second information processing device according to one aspect of the present technology includes a control unit that performs a process while switching among an intro mode as a mode at start of a game, a walk mode in which to walk to the final destination, and an arrival mode in which to arrive at the final destination.

A second information processing method according to one aspect of the present technology includes the step of performing a process while switching among an intro mode as a mode at start of a game, a walk mode in which to walk to the final destination, and an arrival mode in which to arrive at the final destination.

A second program according to one aspect of the present technology causes a computer to execute the step of performing a process while switching among an intro mode as a mode at start of a game, a walk mode in which to walk to the final destination, and an arrival mode in which to arrive at the final destination.

In the first information processing device, information processing method, and program according to one aspect of the present technology, a control is performed to provide destination guidance information for guiding to the destination in the form of voice communication with the user, and a control is performed to provide the present location related information regarding the present location until the user arrives at the destination according to the destination guidance information, in the form of voice communication with the user.

In the second information processing device, information processing method, and program according to one aspect of the present technology, a process is performed while switching among the intro mode as a mode at start of a game, the walk mode in which to walk to the final destination, and the arrival mode in which to arrive at the final destination.

Note that the information processing device may be an independent device or an internal block constituting one device.

Furthermore, the program can be provided by being transmitted via a transmission medium, or by being recorded on a recording medium.

Effects of the Invention

According to one aspect of the present technology, it is possible to entertain the user.

Note that the advantageous effect described herein is not necessarily limited but may be any one of advantageous effects described in the present disclosure.

BRIEF DESCRIPTION OF DRAWINGS

FIG. 12 is a diagram illustrating an example of a table.

FIG. 14 is a diagram illustrating an example of a table.

FIG. 16 is a diagram illustrating an example of a table.

MODES FOR CARRYING OUT THE INVENTION

Modes for carrying out the present technology (hereinafter, called embodiments) will be described below.

<Overview of an Information Processing Device According to One Embodiment of the Present Disclosure>

Figure 1:
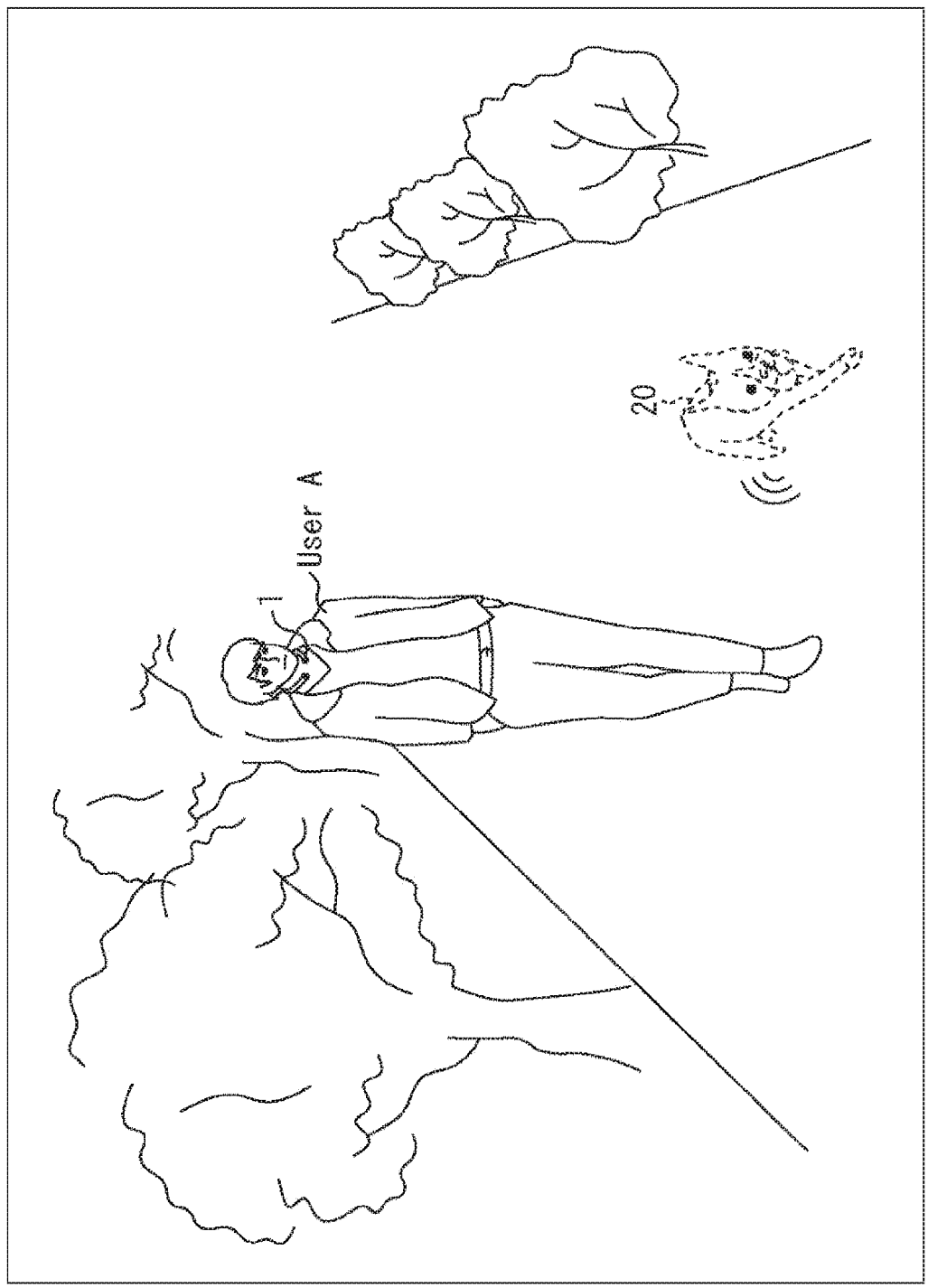
FIG. 1 is a diagram for describing an overview of an information processing device to which the present technology is applied.

First, an overview of an information processing device according to an embodiment of the present disclosure will be provided with reference to FIG. 1. As illustrated in FIG. 1, the information processing device 1 according to the present embodiment is a neck band-type information processing terminal that can be hung on the neck of a user A, for example, which includes a speaker and various sensors (acceleration sensor, gyro sensor, geomagnetic sensor, absolute positioning unit, and others). The information processing device 1 has a function of causing the user to perceive a virtual character 20 as being really present in the real space, by means of a sound image localization technique for spatially arranging voice information. Note that the virtual character 20 is an example of a virtual object.

Thus, the information processing device 1 according to the present embodiment appropriately calculates a relative three-dimensional position where to localize a sound image for causing the virtual character to be perceived on the basis of state of the user and information of the virtual character, and presents more realistically the presence of the virtual object in the real space. Specifically, for example, the information processing device 1 calculates a relative height at which to locate voice of the virtual character on the basis of height and state (standing or sitting, etc.) of the user A and the height information of the virtual character, and localizes a sound image. This allows the user to realistically feel the size of the virtual character.

Furthermore, the information processing device 1 changes the sound of the virtual character according to the state or the movement of the user A to give a sense of reality to the movement of the virtual character. At this time, the information processing device 1 performs a control to localize the sounds to the corresponding body parts of the virtual character on the basis of the sound type such that the sound of the virtual character's voice is localized at the mouth (head) of the virtual character, and the sound of the virtual character's footsteps is localized at the foot of the virtual character, for example.

So far, the outline of the information processing device 1 according to the present embodiment has been provided. Subsequently, a configuration of the information processing device 1 according to the present embodiment will be described with reference to FIGS. 2 and 3.

<Configuration of Appearance of the Information Processing Device>

Figure 2:
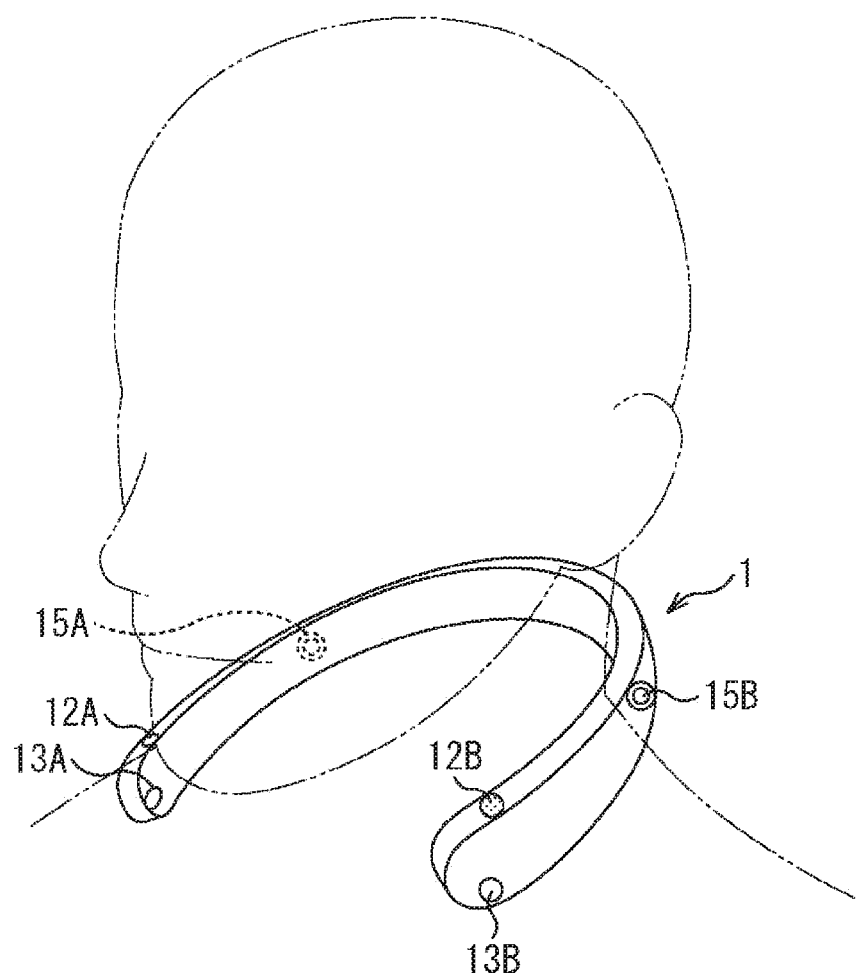
FIG. 2 is a perspective view of an example of an appearance configuration of the information processing device to which the present technology is applied.

FIG. 2 is a perspective view of an example of an appearance configuration of the information processing device 1 according to the present embodiment. As illustrated in FIG. 2, the neck band-type information processing device 1 has an attachment unit (attachment portion) shaped so as to make a half turn from both sides of the neck to the rear side (back side). When being put on the user's neck, the information processing device 1 is attached to the user. FIG. 2 is a perspective view of a state in which the attachment unit is attached to the user.

Note that the terms indicating directions such as upper, lower, left, and right are used herein, and these directions refer to directions as seen from the center of the user's body in an upright posture (for example, the position of the pit of the stomach). For example, the term "right" indicates the direction of the right side of the user, "left" indicates the direction of the left side of the user, "upper" indicates the direction of the head side of the user, and "down" Indicates the direction of the foot side of the user. Furthermore, the term "front" indicates the direction in which the user's body faces, and "rear" indicates the direction of the back side of the user.

As illustrated in FIG. 2, the attachment unit may be closely attached to the neck of the user or may be loosely attached to the neck of the user. Note that other forms of the neck-hung attachment unit include, for example, a pendant type that is attached to the user by a neck-hanging cord and a headset type that has a neckband to pass behind the neck instead of the headband to be put on the head.

Furthermore, the use form of the attachment unit may be the form of being directly attached to the human body for use. The form of being directly attached for use refers to the form of being used in the absence of any object between the attachment unit and the human body. For example, the present embodiment also applies to a case where the attachment unit illustrated in FIG. 2 is attached to the user in contact with the skin of the neck. Besides, various forms such as a headset type and a glasses type to be directly attached to the head can be considered.

Alternatively, the use form of the attachment unit may be the form of being indirectly attached to the human body for use. The form of being indirectly attached for use refers to the form of being used in the presence of any object between the attachment unit and the human body. For example, the present embodiment also applies to a case where the attachment unit illustrated in FIG. 2 is attached to the user in contact with the user from above the clothes, such as being attached so as to be hidden under the collar of the shirt. Besides, various forms such as a pendant type to be attached to the user by a neck-hanging cord and a broach type to be attached to a garment with a fastener or the like can be conceived.

Furthermore, as illustrated in FIG. 2, the information processing device 1 includes a plurality of microphones 12 (12A, 12B), cameras 13 (13A, 13B), and speakers 15 (15A, 15B). The microphones 12 acquire voice data such as user voice or ambient environmental sounds. The cameras 13 capture images of the surroundings and acquire imaging data. Furthermore, the speakers 15 reproduce audio data. In particular, the speakers 15 according to the present embodiment reproduce audio signals having undergone sound image localization processing of a virtual character that is to be perceived by the user as if the virtual character actually existed in the real space.

Note that FIG. 2 illustrates a configuration in which the information processing device 1 includes the two microphones 12, the two cameras 13, and the two speakers 15, but the present embodiment is not limited to this. For example, the information processing device 1 may have one microphone 12 and one camera 13, or may have three each or more microphones 12, cameras 13, and speakers 15.

<Internal Configuration of the Information Processing Device>

Figure 3:
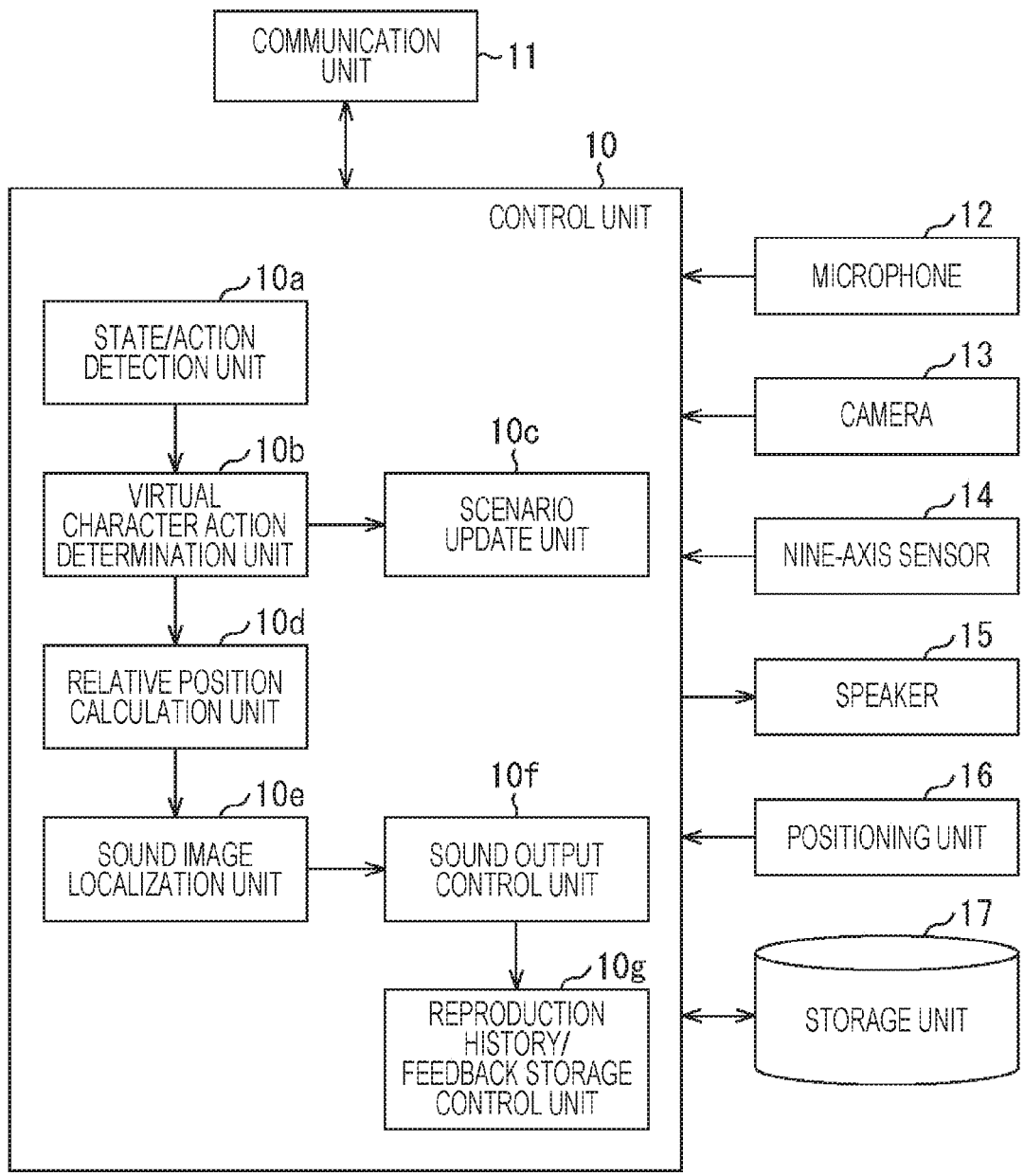
FIG. 3 is a block diagram illustrating an example of an internal configuration of the information processing device.

Subsequently, an internal configuration of the information processing device 1 according to the present embodiment will be described with reference to FIG. 3. FIG. 3 is a block diagram illustrating an example of the internal configuration of the information processing device 1 according to the present embodiment. As illustrated in FIG. 3, the information processing device 1 includes a control unit 10, a communication unit 11, a microphone 12, a camera 13, a nine-axis sensor 14, a speaker 15, a positioning unit 16, and a storage unit 17.

The control unit 10 functions as an arithmetic processing unit and a control unit, and controls the overall operations in the information processing device 1 according to various programs. The control unit 10 is implemented by, for example, an electronic circuit such as a central processing unit (CPU) or a microprocessor. Furthermore, the control unit 10 may include a read only memory (ROM) that stores programs to be used, operation parameters, and the like, and a random access memory (RAM) that temporarily stores parameters and the like varying as appropriate.

Furthermore, as illustrated in FIG. 3, the control unit 10 according to the present embodiment functions as a state/action detection unit 10a, a virtual character action determination unit 10b, a scenario update unit 10c, a relative position calculation unit 10d, an sound image localization unit 10e, an voice output control unit 10f, and a reproduction history/feedback storage control unit 10g.

The state/action detection unit 10a detects the state of the user and recognizes an action based on the detected state, and outputs the detected state and the recognized action to the virtual character action determination unit 10b. Specifically, the state/action detection unit 10a acquires information such as position information, movement speed, orientation, and height of the ear (or the head) as information regarding the state of the user. The user state is information that can be uniquely identified at the detection timing and can be calculated and acquired as numerical values from various sensors.

For example, position information is acquired from the positioning unit 16. Furthermore, the movement speed is acquired from the positioning unit 16, an acceleration sensor included in the nine-axis sensor 14, the camera 13, or the like. The orientation is acquired by a gyro sensor, an acceleration sensor, and a geomagnetic sensor included in the nine-axis sensor 14, or the camera 13. The height of the ear (or the head) is obtained from the physical data of the user, the acceleration sensor, and the gyro sensor. Furthermore, the movement speed and the direction may be acquired using simultaneous localization and mapping (SLAM) that calculates motion on the basis of changes in feature points in a video of which surroundings are continuously captured by the camera 13.

Figure 4:
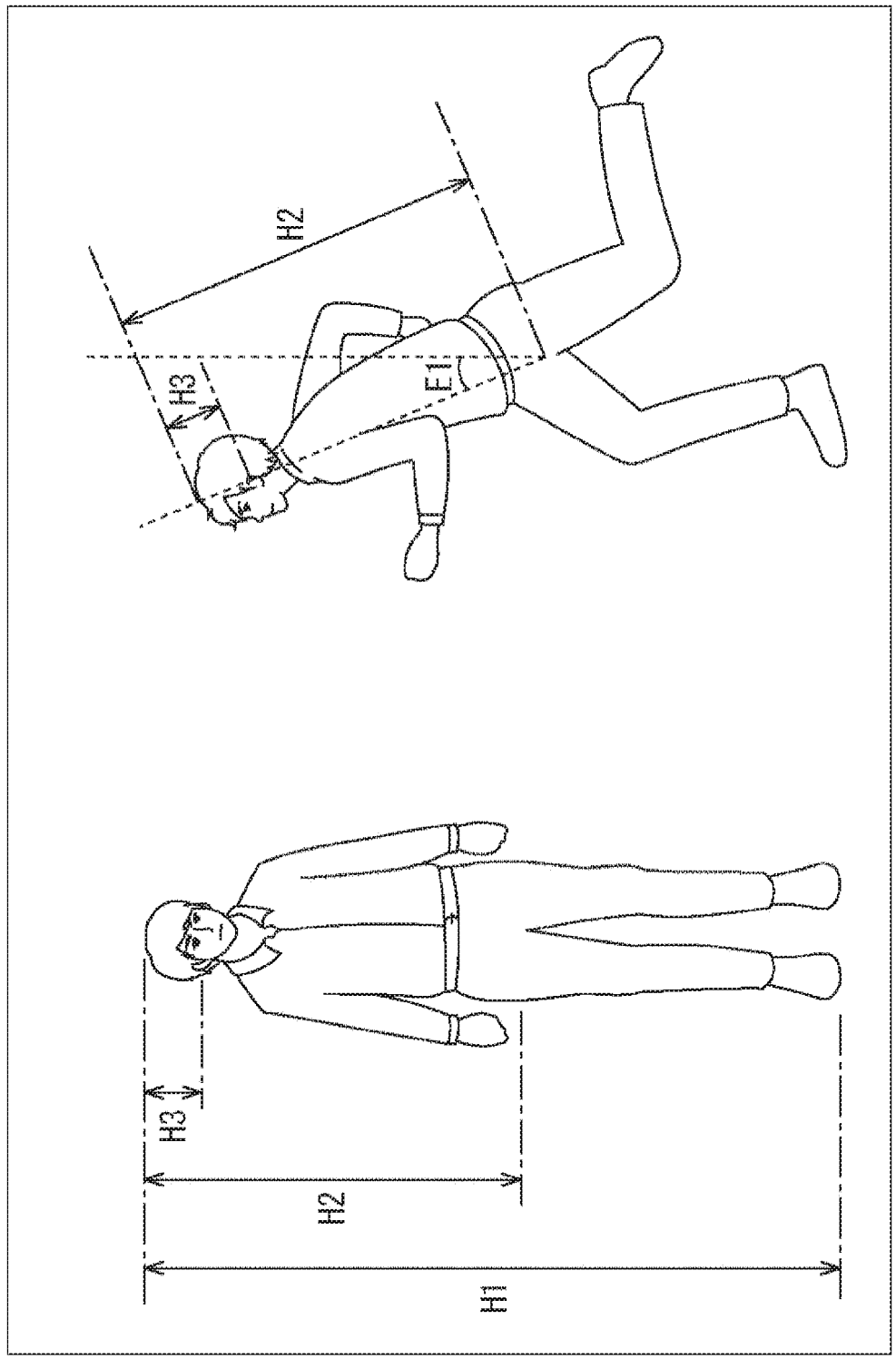
FIG. 4 is a diagram describing physical data of a user.

Furthermore, the height of the ear (or the head) may be calculated on the basis of the physical data of the user. As the physical data of the user, for example, as illustrated on the left side of FIG. 4, a height H1, a seat height H2, and a distance H3 from the ear to the top of the head are set and stored in the storage unit 17. The state/action detection unit 10a calculates the height of the ear, for example, as described below. Note that "E1 (tilt of head)" can be detected as a tilt of the upper body by an acceleration sensor, a gyro sensor, or the like, as illustrated in the right side of FIG. 4.

(Equation 1) In a case where the user is standing:

Height of the ear=height−seat height+(seat height−
distance from the ear to the top of the head)×
$E1$ (tilt of the head)

(Equation 2) In a case where the user is sitting or lying down:

Height of the ear=(seat height−distance from the ear
to the top of the head)×$E1$ (tilt of the head)

The physical data of the user may be generated by another equation.

The state/action detection unit 10a can also recognize the user action by referring to the front and back states. As the user action, for example, "stopping", "walking", "running", "sitting", "lying", "riding in a car", "cycling", "facing the character", and others are assumed. The state/action detection unit 10a can recognize the user action by using a predetermined action recognition engine on the basis of information detected by the nine-axis sensor 14 (acceleration sensor, gyro sensor, and geomagnetic sensor) and position information detected by the positioning unit 16.

The virtual character action determination unit 10b determines the virtual action of the virtual character 20 in the real space (or selects a scenario) in accordance with the user action recognized by the state/action detection unit 10a, and selects a sound content corresponding to the determined action from the scenario.

For example, the virtual character action determination unit 10b causes the virtual character to perform the same action as the user such as causing the virtual character 20 to walk while the user is walking or causing the virtual character 20 to run to follow the user when the user is running, thereby showing the presence of the virtual character.

Furthermore, when determining the action of the virtual character, the virtual character action determination unit 10b selects a sound source corresponding to the action of the virtual character from a sound source list (sound contents) stored in advance as a scenario of contents. At this time, for the sound source with a limit on the number of times of reproduction, the virtual character action determination unit 10b determines whether or not the sound from the sound source is possible on the basis of a reproduction log. Furthermore, the virtual character action determination unit 10b may select a sound source that corresponds to the action of the virtual character. The sound source may be a sound source that suits the user's preference (such as a sound source of a favorite virtual character) or a sound source of a specific virtual character that is associated with the present location (place).

For example, in a case where the determined action of the virtual character is stopping, the virtual character action determination unit 10b selects a voice content (for example, speech or breathing), and in a case where the determined action of the virtual character is walking, the virtual character action determination unit 10b selects a voice content and a footfall content. Furthermore, in a case where the determined action of the virtual character is running, the virtual character action determination unit 10b selects a breathless sound or the like as a voice content. As described above, the virtual character action determination unit 10b selects a sound content according to the action of the virtual character to issue different sounds according to the action (in other words, the virtual character action determination unit 10b does not select or reproduce a sound content not corresponding to the action).

The scenario update unit 10c updates the scenario because the scenario proceeds as the sound content corresponding to the action of the virtual character determined by the virtual character action determination unit 10b is selected from the scenario. The scenario is stored, for example, in the storage unit 17.

The relative position calculation unit 10d calculates a relative three-dimensional position (xy coordinate positions and height) at which the sound source (sound content) of the virtual character selected by the virtual character action determination unit 10b is to be localized. Specifically, first, the relative position calculation unit 10d sets the position of the part of the virtual character corresponding to the type of the sound source with reference to the action of the virtual character determined by the virtual character action determination unit 10b. The relative position calculation unit 10d outputs an sound image localization position (three-dimensional position) of each of the calculated sound contents to the sound image localization unit 10e.

The sound image localization unit 10e performs a audio signal process of sound content such that the corresponding sound content (sound source) selected by the virtual character action determination unit 10b is localized at the sound image localization position of each of the sound contents calculated by the relative position calculation unit 10d.

The voice output control unit 10f controls the speakers 15 to reproduce the audio signal processed by the sound image localization unit 10e. Thus, the information processing device 1 according to the present embodiment performs sound image localization of sound content corresponding to the motion of the virtual character according to the user's state and action at a position, distance, and height appropriate for the user, thereby presenting the realistic motion and size of the virtual character and enhancing the presence of the virtual character in the real space.

The reproduction history/feedback storage control unit 10g controls the storage unit 17 to store the sound source (sound content) from which voice and sound were output by the voice output control unit 10f as a history (reproduction log). Furthermore, the reproduction history/feedback storage control unit 10g controls the storage unit 17 to store the user's reaction as feedback when the voice output control unit 10f outputs voice or sound, such as turning around in the direction of the voice or stopping and listening to speech. As a result, the control unit 10 can learn the user's preference so that the virtual character action determination unit 10b can select a sound content according to the user's preference.

The communication unit 11 is a communication module for transmitting and receiving data to and from another device by wired or wireless communication. The communication unit 11 performs wireless communication with an external device directly or via a network access point, for example, in a mode of wired local area network (LAN), wireless LAN, Wireless Fidelity (Wi-Fi (registered trademark)), infrared communication, Bluetooth (registered trademark), near field/non-contact communication, and others.

For example, in a case where the functions of the control unit 10 described above are included in another device such as a smartphone or a server on a cloud, the communication unit 11 may transmit data acquired by the microphones 12, the cameras 13, and the nine-axis sensor 14. In this case, the other device performs the determination of the action of the virtual character, the selection of the sound content, the calculation of the sound image localization position, the sound image localization process, and others. Besides, in a case where the microphones 12, the cameras 13, or the nine-axis sensor 14 are provided in another device, for example, the communication unit 11 may receive the data acquired by these components and output the same to the control unit 10. Furthermore, the communication unit 11 may receive the sound content selected by the control unit 10 from another device such as a server on the cloud.

The microphones 12 pick up the voice and sounds of the user and the surrounding environment, and outputs the same as sound data to the control unit 10.

Each of the cameras 13 has a lens system including an imaging lens, a diaphragm, a zoom lens, a focus lens, and the like, a drive system for driving the lens system to perform a focus operation and a zoom operation, a solid-state imaging element array that subjects imaging light obtained by the lens system to photoelectrical conversion to generate an imaging signal, and the like. The solid-state imaging element array may be implemented by a charge coupled device (CCD) sensor array or a complementary metal oxide semiconductor (CMOS) sensor array, for example.

For example, the cameras 13 may be provided in a manner of being capable of imaging the area in front of the user in a state where the information processing device 1 (attachment unit) is attached to the user. In this case, the cameras 13 can perform imaging of the motion of the surrounding scenery according to the motion of the user, for example. Furthermore, the cameras 13 may be provided in a manner of being capable of imaging the face of the user in a state where the information processing device 1 is attached to the user. In this case, the information processing device 1 can specify the position of the user's ear and facial expressions from the captured images. Furthermore, the cameras 13 convert data of the captured images into a digital signal and output the same to the control unit 10.

The nine-axis sensor 14 includes a three-axis gyro sensor (detection of angular velocity (rotation speed)), a three-axis acceleration sensor (also called G sensor, detection of acceleration at the time of movement), and a three-axis geomagnetic sensor (compass, detection of absolute direction (orientation)). The nine-axis sensor 14 has a function of sensing the state of the user wearing the information processing device 1 or the state of the surroundings. Note that the nine-axis sensor 14 is an example of a sensor unit, and the present embodiment is not limited thereto. For example, a speed sensor, a vibration sensor, or the like may be additionally used, or at least one of an acceleration sensor, a gyro sensor, or a geomagnetic sensor may be used.

Furthermore, the sensor unit may be provided in a device other than the information processing device 1 (attachment unit), or may be provided in a distributed manner in a plurality of devices. For example, an acceleration sensor, a gyro sensor, and a geomagnetic sensor may be provided in a device (for example, an earphone) attached to a head, and a speed sensor and a vibration sensor may be provided in a smartphone. The nine-axis sensor 14 outputs information indicating the sensing result to the control unit 10.

The speakers 15 reproduce the audio signal processed by the sound image localization unit 10e according to the control of the voice output control unit 10f. Furthermore, the speakers 15 can also convert a plurality of sound sources at any position and in any direction into stereo audio and output the same.

The positioning unit 16 has a function of detecting the current position of the information processing device 1 on the basis of the signal acquired from the outside. Specifically, for example, the positioning unit 16 is implemented by a global positioning system (GPS) positioning unit, which receives radio waves from GPS satellites, detects the position where the information processing device 1 is present, and outputs the detected position information to the control unit 10. Furthermore, the information processing device 1 detects the position by, in addition to GPS, Wi-Fi (registered trademark), Bluetooth (registered trademark), transmission/reception of data with a mobile phone, PHS, smart phone, or the like, or near field communication, or the like, for example.

The storage unit 17 stores programs and parameters for the control unit 10 to execute the functions. Furthermore, the storage unit 17 according to the present embodiment includes scenarios (various sound contents), setting information of a virtual character (shape, height, and others), user information (name, age, address, occupation, work place, physical data, hobbies, preferences, and others). Note that at least part of the information stored in the storage unit 17 may be stored in another device such as a server on the cloud.

A configuration of the information processing device 1 according to the present embodiment has been specifically described above.

<Operations of the Information Processing Device>

Figure 5:
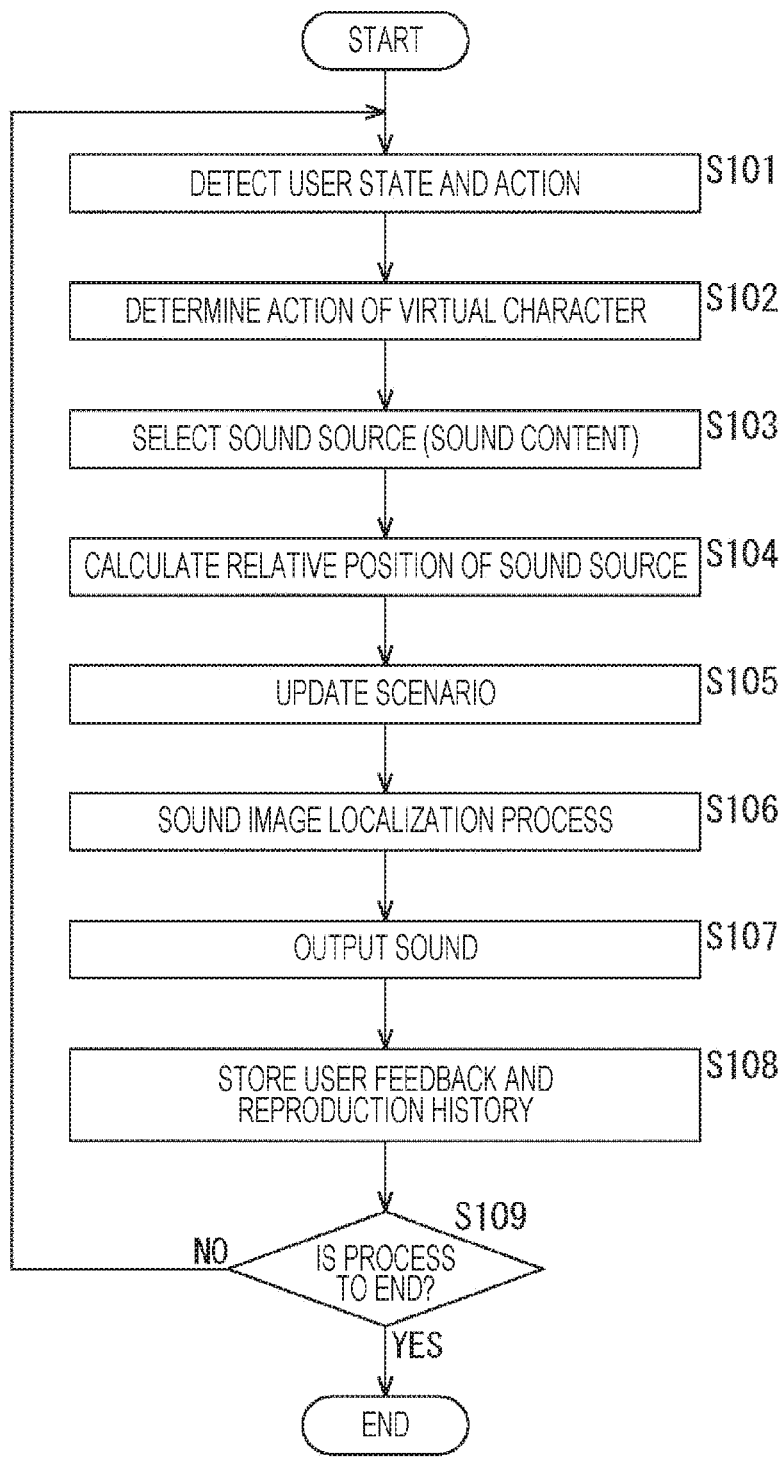
FIG. 5 is a flowchart for describing operations of the information processing device.

Subsequently, audio processing of the information processing device 1 according to the present embodiment will be described with reference to FIG. 5. FIG. 5 is a flowchart illustrating the audio processing according to the present embodiment.

As illustrated in FIG. 5, first, in step S101, the state/action detection unit 10a of the information processing device 1 detects user state and action on the basis of information detected by various sensors (the microphones 12, the cameras 13, the nine-axis sensor 14, or the positioning unit 16).

In step S102, the virtual character action determination unit 10b determines the action of the virtual character to be reproduced in accordance with the detected user state and action. For example, the virtual character action determination unit 10b determines the same action as the detected user action (walking as with the walking of the user, running as with the running of the user, sitting as with the sitting of the user, sleeping as with the sleeping of the user, or the like).

In step S103, the virtual character action determination unit 10b selects a sound source (sound content) corresponding to the determined action of the virtual character action from the scenario.

In step S104, the relative position calculation unit 10d determines the relative position (three-dimensional position) of the selected sound source on the basis of setting information such as the detected user state, user action, the pre-registered physical data of the user such as height, the determined action of the virtual character, and the pre-registered height of the virtual character.

In step S105, the scenario update unit 10c updates the scenario in accordance with the determined action of the virtual character and the selected sound content (in other words, proceeding to the next event).

In step S106, the sound image localization unit 10e performs sound image localization processing on the corresponding sound content to localize the sound image at the calculated relative position of the sound image.

In step S107, the voice output control unit 10f controls the speakers 15 to reproduce the audio signal having undergone the sound image localization processing.

In step S108, the reproduction history/feedback storage control unit 10g stores in the storage unit 17 the history of the reproduced (that is, sound-outputted) sound content and the user's feedback on the sound content.

In step S109, steps S103 to S124 are repeated until the event of the scenario ends. For example, when one game ends, the scenario ends.

Thus, the information processing system according to the embodiment of the present disclosure makes it possible to appropriately calculate a relative three-dimensional position where to localize a sound for causing the virtual character (an example of a virtual object) to be perceived on the basis of the state of the user and the information of the virtual character, and shows more realistically the presence of the virtual character in the real space.

Furthermore, the information processing device 1 according to the present embodiment may be implemented by an information processing system including a headphone (or an earphone, eyewear, or the like) provided with the speakers 15, and a mobile terminal (smartphone or the like) mainly having the function of the control unit 10. At this time, the mobile terminal transmits the audio signal having undergone the sound image localization processing to the headphones for reproduction. Furthermore, the speakers 15 are not necessarily mounted in a device worn by the user but may be implemented by environment speakers installed around the user, for example. In this case, the environment speaker can localize the sound image at an arbitrary position around the user.

<In a Case of Application to a Game>

Description will be added as to a case where the information processing device 1 presenting information to the user by voice as described above is applied to augmented reality (AR) in order to further enhance the entertainment property of the information processing device 1.

In this case described below, the story of the game is of searching a town to find a missing pet owner together with a dog's ghost. The player plays the game of searching the town for the pet owner while achieving various tasks (clearing quests) with hints from the dog's ghost who is not seen but heard and tells various memories or the like with the owner. In this game, the virtual character is the dog's ghost.

Figure 6:
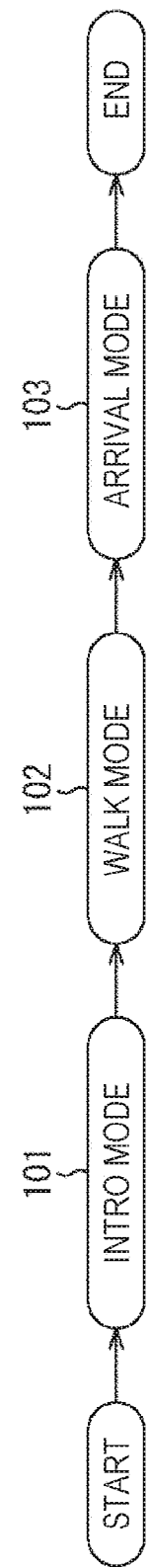
FIG. 6 is a diagram for describing mode transitions of a game.
Figure 7:
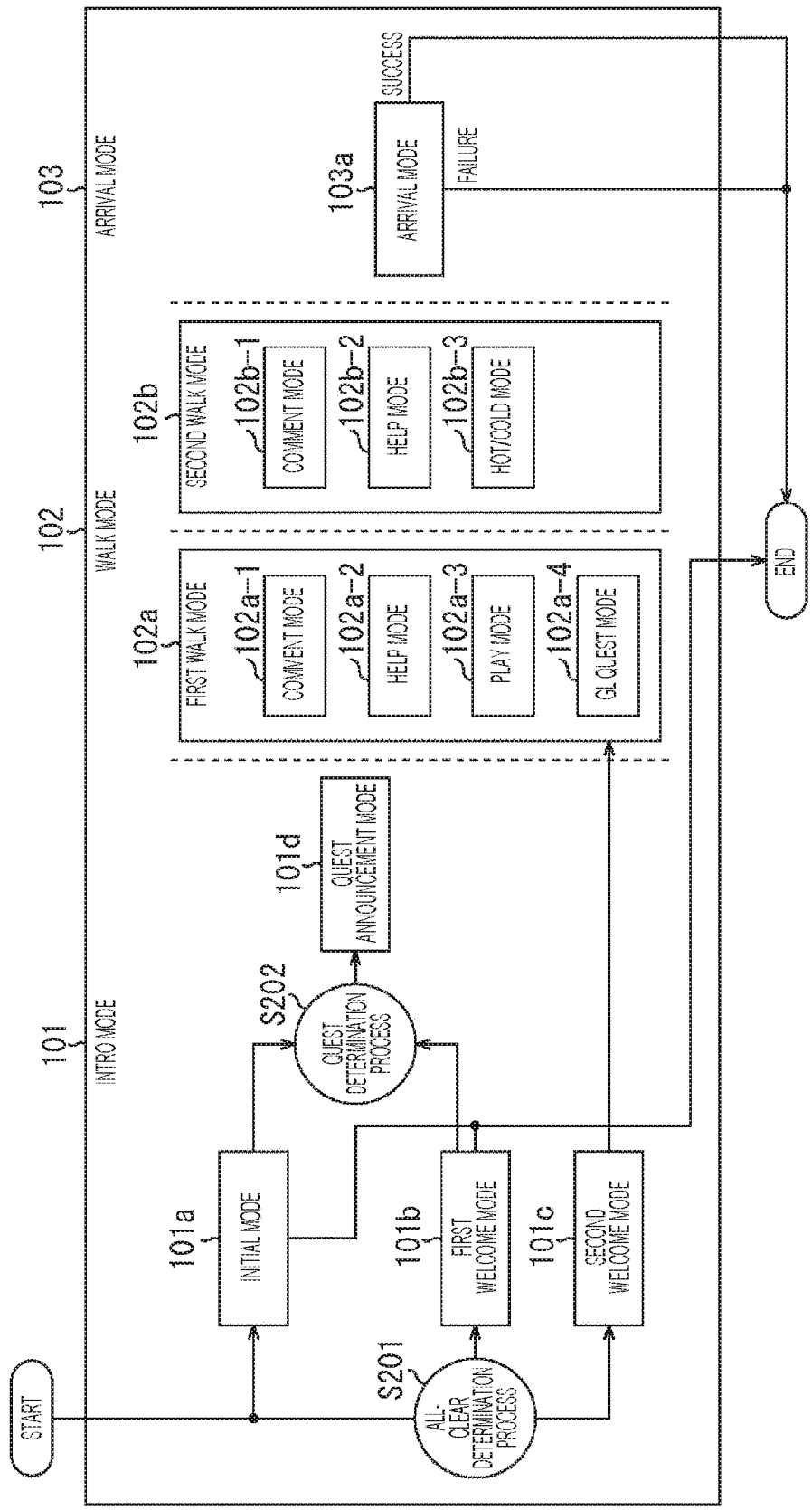
FIG. 7 is a diagram for describing details of the modes.

In this game, modes as illustrated in FIG. 6 are set. Furthermore, each of the modes includes more detailed modes as illustrated in FIG. 7. Further, the processing in these modes is performed by the control unit 10 illustrated in FIG. 3.

Referring to FIG. 6, when the game is started, an intro mode 101 is first entered. The game is started by the user A instructing the information processing device 1 to start the game by a voice command.

In the intro mode 101, the dog appears and provides hints about a nearby quest spot. Note that the quest spot is the final destination, and the hints of the final destination are provided by the dog as a virtual character.

When the intro mode 101 is ended, the mode is shifted to a walk mode 102. In the walk mode 102, the dog makes remarks for presenting the target direction, small daily talks, and the like. Furthermore, in the walk mode 102, when arriving near a predetermined place, an event is generated according to the place. The walk mode 102 is a mode in which events of guiding the user to the final destination and interesting the user are generated in some places.

When the user arrives near the final destination (within a predetermined distance), the game shifts from the walk mode 102 to an arrival mode 103. In the arrival mode 103, the user is told from the dog memories related to the place, or the user is instructed by the dog to further move within the destination, for example. Then, when the quest in the arrival mode 103 is ended, the game is ended.

Each of the modes will be further described with reference to FIG. 7.

When the game is started, the processing in the intro mode 101 is started. In the intro mode 101, an initial mode 101a, a first welcome mode 101b, a second welcome mode 101c, and a quest announcement mode 101d are prepared. Furthermore, in the intro mode 101, an all-clear determination process S201 and a quest determination process S202 are performed.

The initial mode 101a is the intro mode 101 when the game is started for the first time, which is basically implemented only for the first time. In the initial mode 101a, the dog as a virtual character is introduced (self-introduction), and a tutorial for interaction is provided, for example. As the tutorial for interaction, direction recognition, nod recognition (head-shaking recognition), speech recognition, and others are performed.

Furthermore, in the Initial mode 101a, a description of the game is also provided. For example, the role of the dog, the role of the user, motivation, and others are described. Furthermore, in the Initial mode 101a, the user may be allowed to set the character of the dog. For example, the user may be allowed to set the dog according to the user's preference such as the size of the dog (small dog, large dog, or the like), and well-worn dog or gentle dog.

The first welcome mode 101b is the intro mode 101 when the game is started for the second and subsequent times, where all the quests have not been cleared yet. The second welcome mode 101b is the intro mode 101 after all the quests are cleared. Either of the first welcome mode 101b and the second welcome mode 101c is selected by executing the all-clear determination process S201.

Figure 8:
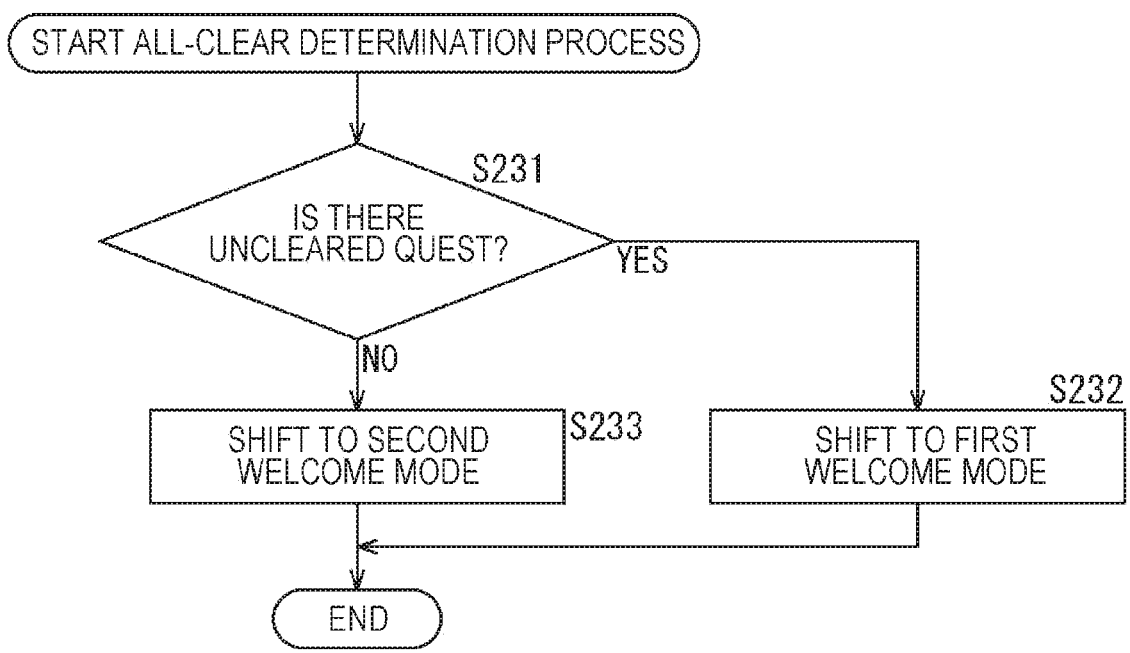
FIG. 8 is a flowchart for describing an all-clear determination process.

FIG. 8 is a flowchart illustrating the details of the all-clear determination process S201.

In step S231, it is determined whether or not there is an uncleared quest. For example, a predetermined number of quests are set in a predetermined region. The predetermined region is an area where the user can move by foot, train, or the like, for example. The plurality of quests is prepared in the predetermined region.

Therefore, in different regions, a plurality of different quests is prepared. For example, the user can enjoy the game in the region where the user lives, and when the user goes traveling, different quests are set in the travel region so that the user can enjoy the game also at the travel destination.

An event as described later or the like is set to be ignited so that the time of one game is about 15 to 30 minutes.

In step S231, it is determined whether or not all the quests set in the predetermined area have been cleared. For example, in a case where ten quests have been set, when there is a history that ten quests have been cleared, it is determined that all the quests have been cleared in step S231.

Furthermore, although a plurality of quests is set in a predetermined region, one quest has one final destination as described later and a predetermined range including the final destination is set as an area, for example. In other words, the number of quests corresponds to the number of areas. Therefore, it is determined in step S231 whether or not the user has visited all of the plurality of areas set in the predetermined region, arrived at the final destination, and cleared the quest at the final destination.

In a case where it is determined in step S231 that there is an uncleared quest, the process proceeds to step S232, and the game shifts to the first welcome mode 101b. In the first welcome mode 101b, conversations are made including general greetings, for example, "Hello", "Good evening", and the like.

Note that, in a case where GPS data cannot be received, in other words, in a case where the positioning unit 16 (FIG. 3) cannot perform positioning, an applicable line is reproduced and the game is ended.

As described later, the quest is determined on the basis of the position where the user is located. Therefore, when positioning cannot be performed, the quest cannot be set and in such a case, the corresponding line such as "Don't know where you are, go out and call again" is reproduced and the game is ended.

When the first welcome mode 101b is ended, the process proceeds to step S202, where a quest determination process (described later) is started. Then, when a quest is determined, the game shifts to the walk mode 102.

On the other hand, in a case where it is determined in step S231 that there is no uncleared quest, in other words, in a case where it is determined that all the quests set in the area where the user is located have been cleared, the process proceeds to step S233. In step S233, the game shifts to the second welcome mode 101c.

Since the second welcome mode 101c is a mode that comes when all the quests are cleared, the quest determination process S202 is omitted, and the game shifts to the first walk mode 102a of the walk mode 102.

Although will be described later in detail, the first walk mode 102a includes a mode in which the user can enjoy regardless of the quest. Thus, in this mode, the user who has cleared all the quests can enjoy walks in town.

Thus, the Initial mode 101a, the first welcome mode 101b, or the second welcome mode 101c is executed. In a case where the initial mode 101a or the first welcome mode 101b is executed, the process proceeds to the quest determination process S202. In a case where the second welcome mode 101c is executed, the game shifts to the first walk mode 102a of the walk mode 102.

Figure 9:
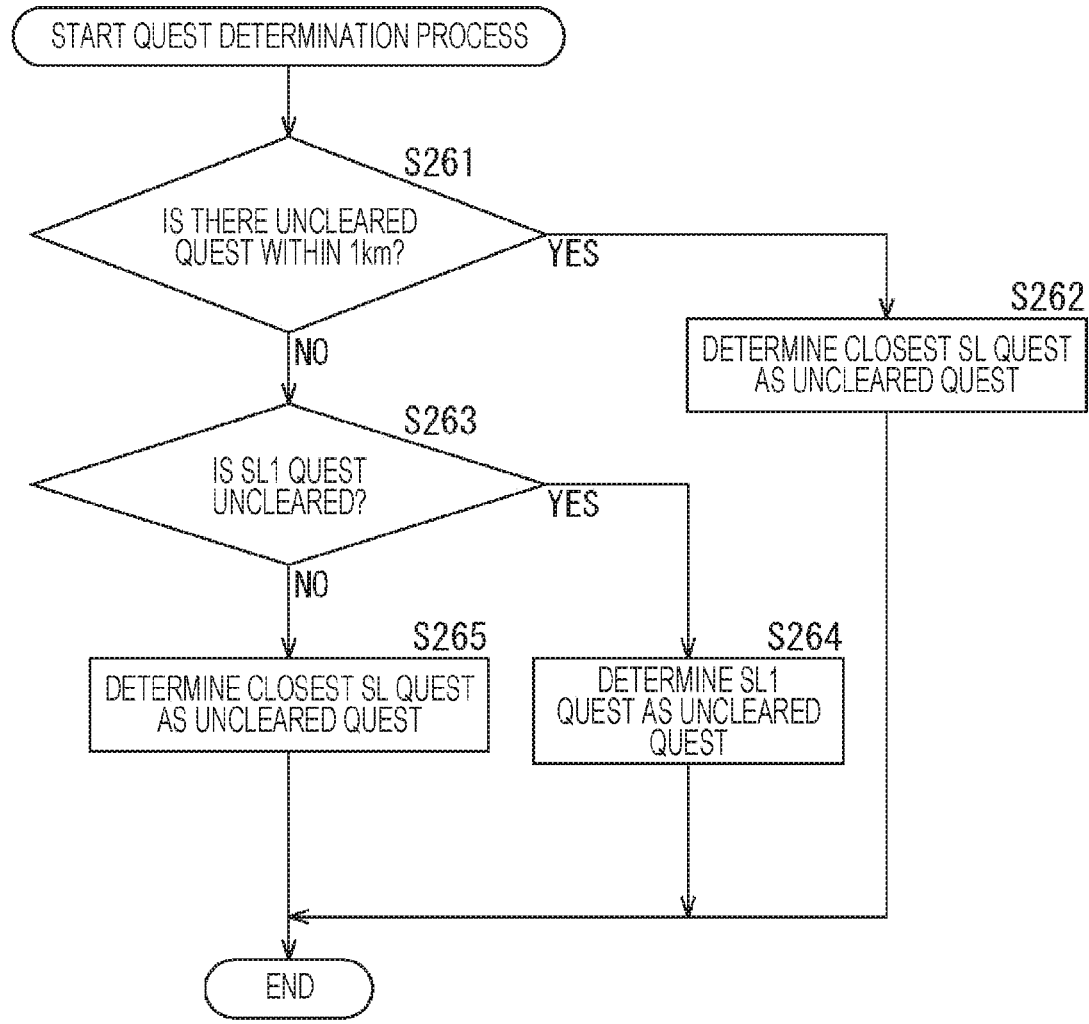
FIG. 9 is a flowchart for describing a quest determination process.

The quest determination process S202 will be described with reference to the flowchart of FIG. 9.

In step S261, it is determined whether or not there is an uncleared quest within 1 km. In a case where it is determined in step S261 that there is an uncleared quest within 1 km, the process proceeds to step S262. In step S262, it is determined that the uncleared quest is a closest SL quest. Here, the SL quest will be described.

Figure 10:
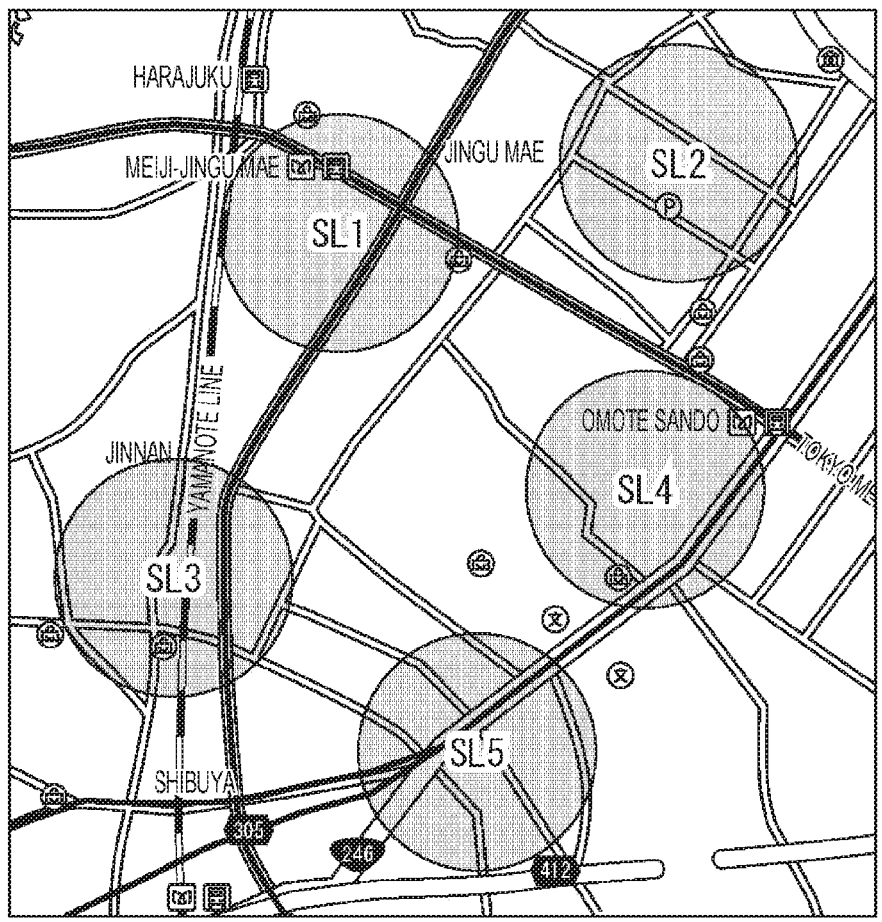
FIG. 10 is a diagram for describing quest areas.

The SL quest is an abbreviation of specific location and is a quest at the final destination. Furthermore, centering on the final destination of the SL quest, a predetermined distance, in this case, a radius of 1 km is set as the SL quest area. As illustrated in FIG. 10, the SL quest area will be described with a preset example.

FIG. 10 illustrates an example of a plurality of SL quest areas set in a predetermined range (region). In the example illustrated in FIG. 10, five SL1 to SL5 quest areas are set in a predetermined area. One SL quest area is a circle with a radius of 1 km centered on the final destination, as illustrated in FIG. 11.

Figure 11:
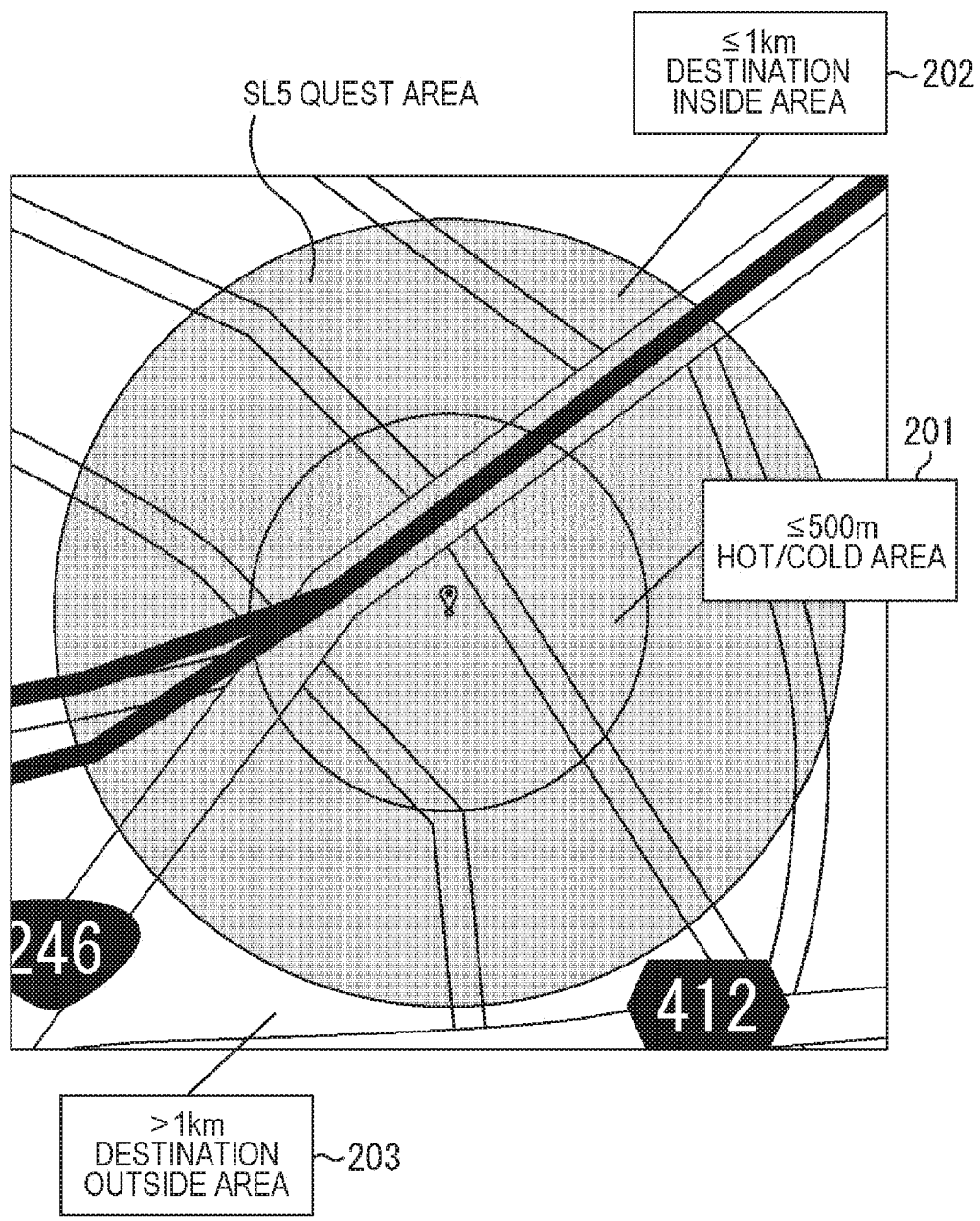
FIG. 11 is a diagram for describing a quest area.

The SL5 quest area illustrated in FIG. 11 is centered on the final destination, has a hot/cold area 201 within a radius of 500 m or less, and a destination inside area 202 within a radius of 1 km or less, and a destination outside area 203 distant from the destination a radius of 1 km or more.

The destination inside area 202 is an area first aimed at when the user starts the game, and an object at the start of the game is to arrive at the destination inside area 202. When the user is present in the destination inside area 202 or the destination outside area 203, the process is performed in the first walk mode 102a of the walk mode 102.

Furthermore, after the quest is determined in the intro mode 101, the information regarding the destination to be first presented to the user in the quest announcement mode 101d (FIG. 7) is information for arriving at the destination inside area 202. The information differs depending on whether the set SL quest area is within 1 km or distant more than 1 km. In other words, the information to be presented differs according to the place at the start of the game.

Furthermore, the information also differs depending on whether it is determined whether the SL quest area is within 1 km from the center (final destination) of the SL quest area or from the circumferential portion of the SL quest area.

First, a case where it is determined whether the SL quest area is within 1 km from the center (the final destination) of the SL quest area will be described.

In step S261 (FIG. 9), it is determined whether or not there is an uncleared quest within 1 km. In other words, it is determined whether or not the user is within the SL quest. As described with reference to FIG. 11, since the SL quest area (for example, the SL5 quest area) has a radius of 1 km, determining that there is an uncleared quest within 1 km means that the user is located in the uncleared SL quest area.

Therefore, in a case where it is determined in step S261 (FIG. 9) that there is an uncleared quest within 1 km and the process proceeds to step S262, the quest is determined to be the closest SL quest in step S262. The SL quest area to be determined is the SL quest area where the user is already located.

Thus, when the user is located in the SL quest area (the destination inside area 202), the information to be presented to the user in the destination inside area 202 is presented.

For example, in this case, since the user is already in the SL quest area, the user is not presented with information by which the place can be accurately identified, such as the name of the place (building). Instead, the user is informed of the features of the building in the final destination, characteristics of the surrounding environment, and the like. For example, the dog as a virtual character utters a line such as "It looks like a stack of five frisbees. And there is a big white one in the center. I think it's near you". Note that the foregoing line as an example represents a five-story pagoda-like building.

A case where it is determined whether the SL quest area is within 1 km from the circumferential portion of the SL quest area will be described.

The determination in step S261 (FIG. 9) as to whether or not there is an uncleared quest within 1 km is a determination as to whether or not the circumferential portion of the SL quest area is within 1 km. As described with reference to FIG. 11, since the SL quest area (for example, the SL5 quest area) has a radius of 1 km, in a case where the circumferential portion thereof is within 1 km, the user is located within 2 km from the center of the SL quest area.

In a case where it is determined in step S261 (FIG. 9) that there is an uncleared quest within 1 km and the process proceeds to step S262, the quest is determined to be the closest SL quest in step S262.

As described above, when the user is located outside the SL quest area (in the destination outside area 203), the user is provided with the information for approaching the closest SL quest area.

For example, in this case, since the user is outside the SL quest area, the user is not presented with information by which the place can be accurately identified, such as the name of the place (building). Instead, the user is provided with specific information indicating the area including the final destination (the destination inside area 202). For example, the dog as a virtual character utters a line such as "I want to go somewhere far today. It is a place where people feel like they are at home, even if they are not born here, and there is a city in the city. Besides, there are special foods and shops there, and some people speak words that other people cannot understand". Note that the foregoing line as an example represents places such as Chinatown and Japanese towns.

After the information is presented in the quest announcement mode 101d, the game shifts to the walk mode 102 (first walk mode 102a).

Note that the user may be allowed to repeatedly listen to the information regarding the destination announced in the quest announcement mode 101d when he or she has missed the information, for example.

On the other hand, in a case where it is not determined in step S261 that there is an uncleared quest within 1 km, the process proceeds to step S263. This case is a case where the game is started when the user is located in the destination outside area 203 (FIG. 11).

Referring to FIG. 10, a plurality of SL quest areas is set in a predetermined region. When the user starts the game from outside these SL quest areas and there is no SL quest area near the present location, the process comes to step S263 (FIG. 9). In step S263, it is determined whether or not the SL1 quest is uncleared.

In the example illustrated in FIG. 10, although the SL1 to SL5 quest areas are set, the SL1 quest area is a quest area different from the other SL2 to SL5 quest areas. For example, the quests in the SL1 quest area are considered to be directed for beginners (users who are new to this game).

For example, the SL1 quest area is dense with quests, where it is regarded as being relatively easy to accomplish each quest. In a case where there is such an area (quests) for beginners, such quests are set on a priority basis.

In a case where it is determined in step S263 that the SL1 quest is uncleared, the process proceeds to step S264, and the quest is set in the SL1 quest (SL1 quest area). Then, information for heading to the SL1 quest area is provided in the quest announcement mode 101*d* (FIG. 7).

For example, in this case, since the user is outside the SL quest area, the user is not presented with information by which the place can be accurately identified, such as the name of the place (building) as in the case described above. Instead, the user is provided with specific information indicating an area including the final destination (the destination inside area 202).

For example, the dog as a virtual character utters a line such as "I want to go somewhere far today. It is a place where people feel like they are at home, even if they are not born here, and there is a city in the city. Besides, there are special foods and shops there, and some people speak words that other people cannot understand". Note that the foregoing line as an example represents places such as Chinatown and Japanese towns.

Furthermore, in addition to such lines, there are lines suggesting that it may take time due to a slightly distant location such as "If you have time to go somewhere far, I want to go there", or lines for inviting the user may be uttered as lines in the quest announcement mode 101*d* (FIG. 7).

After the information is presented in the quest announcement mode 101*d*, the game shifts to the walk mode 102 (first walk mode 102*a*).

Note that the user may be allowed to repeatedly listen to the information regarding the destination announced in the quest announcement mode 101*d* when he or she has missed the information, for example. At this time, the same lines may be repeated, or only the lines related to the place (lines excluding lines of invitation described above or the like) may be repeated.

On the other hand, in a case where it is determined in step S263 that the SL1 quest is already cleared, the process proceeds to step S265. In step S265, the quest is set to the closest SL quest (SL quest area) from the position where the user is. At this time, the already cleared SL quests are excluded from setting targets.

In other words, once cleared, the SL quest is not to be set again. Therefore, to set the SL quest in step S265, the closest SL quest is selected from among the SL quests excluding the cleared SL quests.

This makes it possible to prevent the user from being repeatedly invited to the same SL quest so that, when playing the game, the user can be always shown a new place. Therefore, the user can enjoy the game every time without getting tired.

In the example illustrated in FIG. 10, although the SL1 to SL5 quest areas are set, the closest and uncleared SL quest area is selected from among the SL2 to SL5 quest areas other than the SL1 quest area.

Note that, in the example of the SL quest area illustrated in FIG. 10, the areas are arranged without overlapping each other, but the areas may be arranged in an overlapping state. Furthermore, while the predetermined quest is being executed, in a case where the information of another quest is presented (in a case where the quest announcement mode 101*d* is executed), the both quests may be brought into the execution state (active state).

In this way, when the SL quest is set and the user is presented with the information for going to the destination inside area 202 of the set SL quest (the quest announcement mode 101*d* is executed and ended), the mode shifts to the walk mode 102.

The walk mode 102 includes a first walk mode 102*a* and a second walk mode 102*b*. Here, the following description will be given on the assumption that there are the two walk modes 102. However, there may be one walk mode 102 or two or more walk modes 102.

The first walk mode 102*a* and the second walk mode 102*b* are modes switchable according to the distance from the center position (final destination) of the SL quest area. Here, the description will be continued on the assumption that the distance from the center position (final destination) of the SL quest area can be switched with 500 m as a threshold as illustrated in FIG. 11.

The first walk mode 102*a* is a mode in which the distance from the center position (final destination) of the SL quest area is more than 500 m, and the second walk mode 102*b* is a mode in which the distance from the center position (final destination) of the SL quest area is 500 m or less.

In other words, the first walk mode 102*a* is the walk mode 102 in which the user is in the destination outside area 203 or the destination inside area 202 (but excluding the hot/cold area 201), and the second walk mode 102*b* is the walk mode 102 in which the user is in the hot/cold area 201.

Note that the plurality of walk modes 102 can be set by finely setting the distances. In other words, as described above, it is possible to set two or more walk modes 102. Two or more walk modes 102 can be set by providing a plurality of thresholds according to the distance.

Referring to FIG. 7, the walk mode 102 will be further described.

The first walk mode 102*a* includes a comment mode 102*a*-1, a help mode 102*a*-2, a play mode 102*a*-3, and a GL quest mode 102*a*-4. In addition, the second walk mode 102*b* includes a comment mode 102*b*-1, a help mode 102*b*-2, and a hot/cold mode 102*b*-3.

The comment mode 102*a*-1 is a mode for speaking lines other than the information regarding the destination, and is a mode prepared for the user to have familiarity with the virtual character so that the user will not get tired, for example. For example, in the comment mode 102*a*-1, general lines are prepared in accordance with time and weather on that occasion.

For example, in the comment mode 102*a*-1, processing can be performed on the basis of a table as illustrated in FIG. 12. The table 301 illustrated in FIG. 12 is a table in which IDs, frequencies, ignition suppression times, conditions, and lines are managed in association. Note that the lines and the like illustrated in FIG. 12 are merely examples, and are not descriptions indicating limitations.

The "ID" is information allocated to identify a line. The description will be continued here assuming that the numbers from 001 are allocated. The "frequency" is a time indicating an approximate frequency at which a line is given.

However, the lines are controlled so as not to be repeatedly uttered as described above, and the ignition suppression time is provided. The "ignition suppression time" is a preset time at least for which no ignition is to occur after ignition occurred once (a line was uttered once).

The "condition" is a condition, if any, under which a line is uttered. As conditions, an ignition possible time zone, an ignition possible action type, and the like can be preset.

The "ignition possible time zone" represents a time zone in which a line is uttered. In that time zone, the line is uttered. The "ignition possible action type" represents a condition that a line is uttered when the user's action meets the condition, and represents a condition that the line is uttered when the user performs such an action.

Referring to the table 301 illustrated in FIG. 12, with the ID "001", for example, the frequency is "10 minutes", the ignition suppression time is "30 minutes", and the condition is "13 to 18 o'clock".

If the time zone during which the game is played is between 13 and 18 o'clock, the line with ID "001" may be ignited at a frequency of about 10 minutes. However, the line is set with a condition that, when being ignited once, the line will not be ignited for 30 minutes. Furthermore, the line to be uttered is "(Stomach rumbling) Oh. Sorry. My stomach was rumbling. When's dinner?" In addition, in the column of the line, a stage direction such as (stomach rumbling) is also described.

Further, referring to the table 301 illustrated in FIG. 12, for example, a line with the ID "002" has a condition of "16 to 4 o'clock". Accordingly, when the game is played in the time zone of 16 to 4 o'clock, the line such as "I'm slightly sleepy" is to be uttered.

Furthermore, referring to the table 301 illustrated in FIG. 12, for example, a line with the ID "003" has no condition. The line such as "(Stomach sound) hungry" is to be uttered.

Furthermore, referring to the table 301 illustrated in FIG. 12, for example, a line with the ID "004" has no condition. The line such as "(sniff) Ah. I think there is a cat nearby" is to be uttered.

Furthermore, referring to the table 301 illustrated in FIG. 12, for example, a line with the ID "005" has a condition of "action=standstill". Accordingly, when it is determined that the user is standstill, the line such as "Let's walk. We will arrive at a familiar place" is to be uttered.

Furthermore, referring to the table 301 illustrated in FIG. 12, for example, a line with the ID "006" has a condition of "indoor". Accordingly, when it is determined that the user is indoors, the line such as "I love to be outside. So let's go out" is to be uttered.

When the user is indoors, data from GPS cannot be received, and positioning may not be enabled. The foregoing line is to be uttered in such a situation. Such a line is uttered immediately when it is determined that positioning cannot be performed. The "frequency" is set to "0" so that the line can be uttered instantly.

Furthermore, referring to the table 301 illustrated in FIG. 12, for example, a line with the ID "007" has a condition of "rainy day". Accordingly, when it is determined that it rains (bad weather), the line such as "My owner would wipe me with a towel when I ran in the rain" is to be uttered.

Furthermore, referring to the table 301 illustrated in FIG. 12, for example, lines with the IDs of "008", "009", and "010" are different barks such as "Bark 1", "Bark 2", and "Bark 3", respectively. In this case, the virtual character is a dog and these different barks are to be uttered.

As described above, in the comment mode 102a-1, casual remarks (comments) based on the conditions such as time zone, user action, and weather, or comments for preventing the user from being bored under no condition are to be uttered as appropriate.

A return will be made to the description with reference to FIG. 7. The comment mode 102a-1 of the first walk mode 102a is a mode in which the comments as described above are to be uttered. Furthermore, the second walk mode 102b also includes the comment mode 102b-1. In the comment mode 102b-1 of the second walk mode 102b, comments different from the comments in the comment mode 102a-1 of the first walk mode 102a may be uttered, or the same comments may be uttered.

In other words, a table referred to in the comment mode 102b-1 of the second walk mode 102b may be different from or the same as the table referred to in the comment mode 102a-1 of the first walk mode 102a.

The first walk mode 102a also includes the help mode 102a-2. Furthermore, the second walk mode 102b also includes the help mode 102b-2. In the help modes 102a-2 and 102b-2, as in the comment modes 102a-1 and 102b-1, the same table may be referred to so that lines regarding the same help are uttered, or different tables may be referred to so that lines regarding different helps are uttered.

Here, the description will be continued assuming that the help mode 102a-2 and the help mode 102b-2 are the same, taking the help mode 102a-2 as an example.

The help mode 102a-2 is a mode in which a line including information for guiding the user to the destination (destination guidance information) is uttered when it is determined that the user has difficulty in arriving at the destination (destination inside area 202).

The help mode 102a-2 may not occur when the user is approaching the destination smoothly, or may occur at predetermined intervals even when the user is approaching the destination smoothly.

In the help mode 102a-2, the name is clarified to a certain degree, or information for allowing the user to easily guess the destination is suggested. For example, the dog as a virtual character utters the line such as "My old friend told me that it looked like another country. He/She said something like . . . " (=a hint about Japanese town).

The first walk mode 102a also includes the play mode 102a-3. The play mode 102a-3 is a mode provided to prevent the user from getting bored until arriving at the SL quest area, in which a game for placing or picking up a toy is implemented, for example.

A plurality of spots for shifting to the play mode 102a-3 is set in a predetermined region. Here, the shift to the play mode 102a-3 is described as ignition of a play event as appropriate.

A spot where a play event is ignited (denoted as a play spot) is set to an area within a radius of 100 m around a point where people easily gather, for example. Furthermore, the play spot is set so as not to overlap with a GL spot described later.

Also, the play spot may be set so that a play event is ignited whenever the player enters the spot or the play event is ignited only in a predetermined time period. The play event may be controlled to be ignited or not to be ignited according to a predetermined day of the week, weather, or the like.

When the user passes through the same place at different timings, the play event may or may not occur so that the user can enjoy different discoveries each time in the same place.

In a case where the user enters the play spot, the game shifts from the mode at that point in time to the play mode 102a-3, and the processing in the play mode 102a-3 is started. That is, in this case, at a location where the user is (the present location), an event set to the location is ignited, and information regarding the location (present location related information) is provided. In the play mode 102a-3, an event for leaving the user's own toy and an event for finding a toy left by another user are prepared.

In the event of leaving the player's own toy, the user can leave the toy in a case where he or she accomplishes the determined task. If he or she fail, the user cannot leave the toy in that place.

The user can enjoy accomplishing the task while leaving his or her mark by leaving the toy.

If the task fails, the play event is controlled not to be ignited only after the user exits from the play spot or a preset time elapses such as 20 minutes, for example.

When accomplishing the task, the user can leave the toy there. The toy is the virtual character's toy, in this case, the dog's toy.

Note that, in the present embodiment, the game provided by the information processing device 1 as illustrated in FIG. 2 is taken as an example. Furthermore, the game provided by the information processing device 1 is a game using voice, not a game using display. Thus, the toy is also conceptual and not a visible toy.

It is left to the user's imagination what kind of toy is there. Furthermore, the virtual character may provide the user with hints for imaging the toy. The user can enjoy the pleasure of imagining the invisible toy by the hints from the virtual character.

In a case where the user revisited the place where he or she left a toy in the past, the virtual character utters a line such as "This is the place where you put my toy. Did anyone play with it?"

Note that at the time of such a revisit, a control may be performed such that the toy cannot be placed again there or can be placed again there (the event can occur).

Referring to FIG. 7, after all the quests are cleared and the second welcome mode 101*c* is executed, the first walk mode 102*a* may be executed without shifting to the quest announcement mode 101*d*.

For the user who has cleared all the quests, when the user revisits the place (play spot) he or she has stopped before during a walk for clearing the quest, a message of reminding him or her of the first visit can be issued in such the play mode 102*a*-3.

In a case where the user enters the play spot, an event of leaving a toy occurs. Then, after the occurrence of the event, an event of discovering a toy left by another user can occur. In other words, an event of discovering a toy will not be ignited before an event of leaving a toy.

An event of discovering a toy left by another user is ignited when the user passes the spot where the other user left the toy.

However, in order to prevent successive ignition, a control may be performed such that, once ignition is performed, the next ignition will not occur until after a lapse of a predetermined time.

Successive ignition may be controlled not to occur for the same user. For example, in a case where a plurality of toys is left on the street where the user is walking, as he or she walks on the street, an event occurs such that the user will successively discover toys. In order to prevent such successive ignition, for the user to which an event of discovering a toy has been ignited once, a control may be performed so that an event of discovering a toy will not occur until after a lapse of a predetermined time.

Furthermore, successive ignition may occur for the same toy. For example, in a case where there is a plurality of users in the vicinity of one toy, an event of that toy will be ignited for each of the plurality of users. In order to prevent such a thing, in other words, in order to ignite an event of one toy for only one user within a predetermined time, for example, two hours, a control may be performed such that an event of the toy having been discovered once will not occur until after a lapse of a predetermined time.

At a spot where no toy is left, an event of discovering a toy left by another user will not be ignited. Furthermore, different events may be ignited depending on the number of times the user has discovered a toy. In different events, different toys may be discovered, different lines may be uttered, different tasks may be imposed, and the like.

Here, an event of placing a toy and an event of discovering a toy are ignited, However, other events may occur or other events may occur as play events as well.

Note that an event of leaving a toy can be processed by the information processing device 1, but an event of discovering a toy requires management of the information that another user has left the toy and is difficult to process only by the information processing device 1. Therefore, a server may be provided in the system to manage the spots where such toys are placed.

Furthermore, in a case where such a server is provided in the system, the server and the information processing device 1 need to communicate. Therefore, when the server and the information processing device 1 can communicate, both an event of placing a toy and an event of discovering a toy are ignited. However, when the server and the information processing device 1 cannot communicate, an event of placing a toy is ignited but an event of discovering a toy is not be ignited.

Furthermore, when the server and the information processing device 1 cannot communicate, an event of placing a toy is ignited, but data about the left toys cannot be supplied to the server, so the left toys are not managed by the server as toys to be discovered by other users.

In this manner, the play mode 102*a*-3 is provided as a mechanism for entertaining the user even before arrival at the SL quest area (in the hot/cold area 201). Furthermore, in addition to the play mode 102*a*-3, the GL quest mode 102*a*-4 is provided as a mechanism for entertaining the user.

A plurality of spots for shifting to the GL quest mode 102*a*-4 is set in a predetermined region. Here, transition to the GL quest mode 102*a*-4 will be described as ignition of a GL quest event as appropriate.

The spot at which the GL quest event is ignited (described as GL quest spot) is set, for example, at predetermined buildings of post offices, pet shops, gas stations, libraries, schools, butcher shops, and at predetermined places such as parks and beaches.

Figure 13:
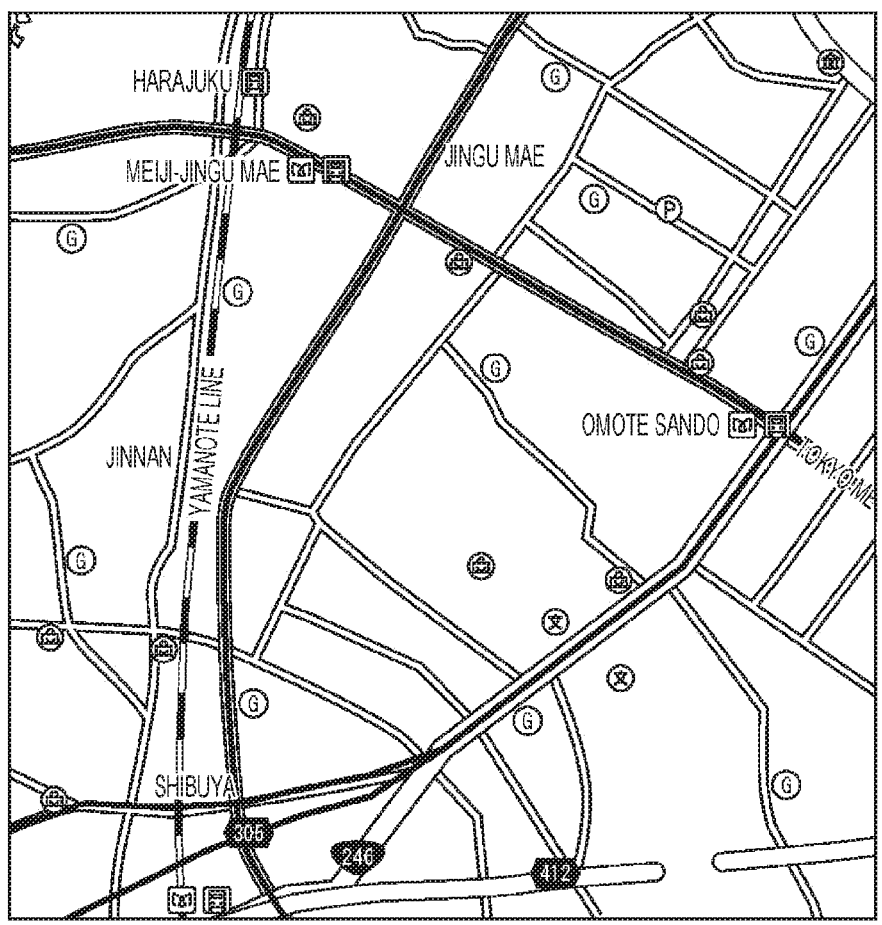
FIG. 13 is a diagram illustrating an example of arrangement of GL quests.

For example, as illustrated in FIG. 13, a plurality of GL spots is set in a predetermined region. In FIG. 13, the portions shown with G in the circle indicate GL spots. The GL spots illustrated in FIG. 13 are, for example, the buildings or specific places described above.

When the user enters a GL quest spot within a radius of 80 m, for example, the game shifts from the mode at that time to the GL quest mode 102*a*-4. In other words, when the user enters the GL quest spot within a radius of 80 m, for example, a GL quest event is ignited. That is, in this case, at a location where the user is (the present location), an event set to the location is ignited, and information regarding the location (present location related information) is provided.

Also, the GL quest event may be controlled to be ignited or not to be ignited depending on a predetermined time zone, day of the week, weather, and the like. For example, when a pet shop is set as a GL quest spot, the GL quest event may be set to be ignited only during the time zone in which the pet shop is open.

In other words, a condition for ignition may be set for each GL quest event, and a control may be performed such that the event is ignited when the condition is satisfied.

Furthermore, as described above, the GL quest spot is set so as not to overlap with the play spot. In other words, each spot is set so that the GL quest event and the play event are not ignited simultaneously at the same place.

Furthermore, when the GL quest event is ignited, the GL quest is treated as cleared. For example, when the GL quest spot is a pet shop, the quest is reproduction of a line such as "My old friend bought me a bait here". When the line is uttered, the quest is treated as cleared.

Furthermore, once the GL quest event is ignited, the line may be reproduced there after even if the user moves out of the area of the spot thereafter. Furthermore, in a case where the user visits the same GL quest spot a plurality of times, for example, two to three times or more times, a line corresponding to the number of times may be reproduced.

Furthermore, the GL quest events (GL quest spots) may be managed for each category, and the GL quest events belonging to the same category may be controlled not to be ignited successively. Without such a control, if the user is walking on a street where there is a plurality of pet shops successively aligned, for example, the GL quest events set in "pet shop" will be ignited repeatedly.

In order to prevent such a thing, GL quest events belonging to the same category may be controlled not to be ignited successively. Furthermore, in a case of controlling the GL quest events so as not to be ignited successively in this way, a predetermined time, for example, 20 minutes may be provided such that GL quest events belonging to the same category are not ignited until after a lapse of 20 minutes.

The first walk mode 102a includes the comment mode 102a-1, the help mode 102a-2, the play mode 102a-3, and the GL quest mode 102a-4. The order of priority of these modes, in other words, the order of priority of utterance in these modes can be set as described, for example.

Help mode 102a-2>play mode 102a-3>GL quest mode 102a-4>comment mode 102a-1

For example, in a case where the timing for shifting to the help mode 102a-2 and the timing for shifting to the GL quest mode 102a-4 take place simultaneously, the help mode 102a-2 is executed in priority to the GL quest mode 102a-4 so that the utterance in the help mode 102a-2 is given.

<About the Second Walk Mode 102b>

Next, the second walk mode 102b will be described. The second walk mode 102b includes the comment mode 102b-1, the help mode 102b-2, and the hot/cold mode 102b-3.

Among these modes, the comment mode 102b-1 and the help mode 102b-2 can be the same as the comment mode 102a-1 and the help mode 102a-2 in the first walk mode 102a. The description here assumes that these modes are the same. Thus, the duplicated description is omitted here. Note that, as a matter of the course, they may be different. For example, in the help mode 102a-2 and the help mode 102b-2, different information regarding the destination can be provided to the user.

Referring to FIG. 11 again, the second walk mode 102b is a mode that is executed when the user enters the hot/cold area 201. In other words, in the second walk mode 102b, the user becomes in proximity to the final destination until the SL quest is ignited.

In the hot/cold area 201, the second walk mode 102b is executed to provide the user with information as to whether or not the user is in proximity to the final destination. The mode for providing the information is the hot/cold mode 102b-3.

In the hot/cold mode 102b-3, for example, a table 302 as illustrated in FIG. 14 is referred to and lines are set. Referring to the table 302 illustrated in FIG. 14, in the hot/cold mode 102b-3, lines are prepared corresponding to cases of "getting close to the destination", "getting away from the destination", "here, here (call from the left)", and "here, here (call from the right).

When the user is getting closer to the destination, for example, the line for the ID "H01" "go straight this road", the line for the ID "H02" "I feel approaching. Let's go on this way", and the line for the ID "H03" "Here, this road" are prepared.

For example, the direction in which the head of the user is facing is determined. In a case where the final destination is in that direction, one of these lines is selected and uttered by the virtual character.

In addition, the lines here are an example and are not limited ones. Therefore, the present technology is not limited to the lines listed here, and a larger number of lines may be prepared than the number of lines listed here.

When the user is getting away from the destination, for example, the line with the ID "C01" "It looks different somehow. Let's go on another way", the line with the ID "C02" "This way is different", and the line with the ID "C03" "I don't know this road. I want to go on another road" are prepared.

For example, the direction in which the head of the user is facing is determined. In a case where the final destination is in the direction opposite to that direction, one of these lines is selected and uttered by the virtual character.

Other lines are also provided to guide the user to the final destination. When the user is to move (advance) to the left, a line is selected from the column "here, here (call from the left)" in the table 302 and is uttered by the virtual character.

For example, in the table 302, there are prepared lines for "here, here (call from the left)" such as "Here, here. This way", "Something gives a nostalgic smell here", and "Come here".

These lines are uttered from the left side of the user so that the user can feel as if the virtual character is located on the left side of the user and says "Here, here" from that direction. Thus, the user moves in the direction indicated by the virtual character, in this case, to the left.

Similarly, when the user is to move (advance) to the right, a line is selected from the column "here, here (call from the right)" in the table 302 and is uttered by the virtual character. For example, in the table 302, there are prepared lines for "here, here (call from the right)" such as "Here, here. This way", "Something gives a nostalgic smell here", and "Come here".

These lines are uttered from the right side of the user so that the user can feel as if the virtual character is located on the right side of the user and says "Here, here" from that direction. Thus, the user moves in the direction indicated by the virtual character, in this case, to the right.

In the table 302 illustrated in FIG. 14, the lines for the case of "Here, here (call from the left)" and the lines for the case of "Here, here (call from the right)" are the same as an example. As described above, even if the lines are the same, the user can judge which of the leftward and rightward directions to be selected depending on the left or right side of the user the utterance is given from.

As a matter of the course, the lines for the case of "Here, here (call from the left)" and the lines for the case of "Here, here (call from the right)" may be different lines.

As the lines in the hot/cold mode 102b-3, there may be prepared lines set for each SL quest and lines to be used in common for the SL quests.

The hot/cold mode 102b-3 is executed when the user enters the hot/cold area 201, which is an area within a radius of 500 m centered on the final destination as described above. Then, as described with reference to FIG. 14, the more specific lines for guiding to the quest area are uttered to the user.

The lines in the hot/cold mode 102*a*-3 are uttered, for example, at intervals of one minute. Furthermore, a control may be performed such that the utterance is given when it is determined that the user is moving, and no utterance is given when the user is not moving or when the distance from the final destination is not changed, for example.

Some users may be executing a plurality of SL quests simultaneously. In such a case, the processing in the second walk mode 102*b* is executed for the SL quest (hereinafter, called SL quest A) for which the user has entered the hot/cold area 201 earlier, and the processing in the second walk mode 102*b* is not executed for an SL quest other than the SL quest A (hereinafter, called SL quest B).

In other words, the lines in the hot/cold mode 102*a*-3 are uttered for the SL quest A, but the lines in the hot/cold mode 102*b*-3 are not uttered for the SL quest B. Furthermore, in such a case, in a case where the user goes out of the hot/cold area 201 of the SL quest A but is located in the hot/cold area 201 of the SL quest B, the lines in the hot/cold mode 102*b*-3 are uttered for the SL quest B.

The second walk mode 102*b* includes the comment mode 102*b*-1, the help mode 102*b*-2, and the hot/cold mode 102*b*-3. The order of priority of these modes, in other words, the order of priority of utterance in these modes can be set as described below, for example.

Help mode 102*b*-2>hot/cold mode 102*b*-3>comment mode 102*b*-1

For example, in a case where the timing for shifting to the help mode 102*b*-2 and the timing for shifting to the hot/cold mode 102*b*-3 take place simultaneously, the help mode 102*b*-2 is executed in priority to the hot/cold mode 102*b*-3 so that the utterance in the help mode 102*b*-2 is given.

<About the Arrival Mode 103>

When the user enters a predetermined area near the final destination, the gate shifts from the walk mode 102 to the arrival mode 103.

An area where the game shifts to the arrival mode 103 (described as an SL quest activation area) is set for each SL quest. For example, the SL quest activation area of the SL1 quest is set within a radius of 10 m of the final destination (the center of the SL1 quest area), and the SL quest activation area of the SL2 quest is set within a radius of 100 m of the final destination (the center of the SL2 quest area).

Thus, the size of the SL quest activation area varies for each SL quest area. As a matter of the course, these areas may be set to the same size.

Furthermore, the SL quests is different for each SL quest area. The size of the SL quest activation area can be set to the size suitable for the SL quest. For example, SL quests include quests that are cleared by listening to the reminiscences of the dog as a virtual character, quests that are cleared by further moving within the SL quest activation area, and the like.

In the case of a quest that is cleared by listening to the reminiscences of the dog as a virtual character, the SL quest activation area can be set to a small range. Furthermore, in the case of a quest that is cleared by further moving in the SL quest activation area, the SL quest activation area can be set in a range equal to the movement range.

When processing is performed in the arrival mode 103, the other arrival mode 103 is controlled not to be activated. In other words, a control is performed such that individual arrival modes 103 are not activated for a plurality of SL quests.

In addition, in a case where the set task has completed and the line has been uttered to the end, it is determined that the SL quest has been cleared. That is, in a case where the set task has not completed or in a case where the line has not been uttered to the end, the SL quest is considered as uncleared.

When the game is over regardless of whether or not the SL quest has been cleared, the dog as a virtual character leaves (a footstep to go away is reproduced), and the application is ended.

Note that, as illustrated in FIG. 7, the game can be interrupted by the user performing an interrupt process regardless of the mode. Even when the game is interrupted by the user, the SL quest is regarded as uncleared.

In a case where the SL quest is uncleared in the arrival mode 103 due to failure of a task or the like, the SL quest is kept active.

Figure 15:
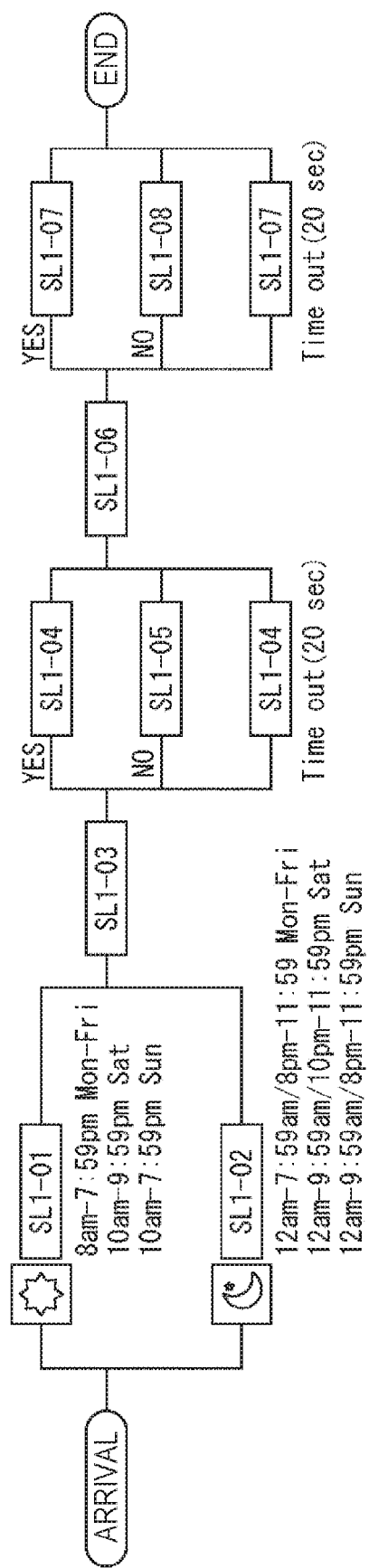
FIG. 15 is a diagram illustrating an example of a flow of processing in an arrival mode.

An example of processing in the arrival mode 103 is illustrated in FIG. 15. Furthermore, in the flow of the process illustrated in FIG. 15, an example of lines to be uttered are illustrated in FIG. 16. As described above, since the SL quest is different for each SL quest, the flow of processing as illustrated in FIG. 15 is also different for each SL quest. Therefore, the description here is an example and is not limited one. In addition, the description here will be continued taking the case of arrival at the SL1 quest (SL1 quest area) as an example.

When the user arrives at the SL quest activation area, different lines are uttered depending on the time zone on that occasion, in this case, daytime or midnight.

In the example illustrated in FIG. 15, the daytime is set from 8:00 AM to 7:59 PM on weekdays from Monday to Friday, and is set from 10:00 AM to 9:59 AM on Saturday and from 10:00 AM to 7:59 PM on Sunday.

Furthermore, in the example illustrated in FIG. 15, midnight is set from 12:00 AM to 7:59 AM and from 8:00 PM to 11:59 PM on weekdays from Monday to Friday, and is set from 12:00 AM to 9:59 AM and from 10:00 PM to 11:59 PM on Saturday, and is set from 12:00 AM to 9:59 AM and from 8:00 PM to 11:59 PM on Sunday.

In a case where the time to arrive at the SL quest activation area is during the daytime, the line for the ID "SL1-01" is uttered. Referring to the table 303 illustrated in FIG. 16, the line with the ID "SL1-01" is "there are a lot of people today. I said that this place is lively, didn't I?" Such a line is uttered when the user arrives in the daytime.

In a case where the time to arrive at the SL quest activation area is in the nighttime, the line with the ID "SL1-02" is uttered. Referring to the table 303 illustrated in FIG. 16, the line with the ID "SL1-02" is "There are few people. During the daytime, there are many people". Such a line is uttered when the user arrives during the nighttime.

After utterance of such a line as described above, a line with the ID "SL1-03" is uttered. Referring to the table 303 illustrated in FIG. 16, the line with the ID "SL1-03" is "Look. There's a restaurant. Why don't we go. (excited bark)". Such a line is uttered with an excited bark.

In a case where the user hears this utterance and shows a YES reaction to the invitation "Why don't we go?", such as replying "Let's go" or starting to walk to the direction of the restaurant, for example, the line with the ID "SL1-04" is uttered. In a case where the user shows a NO reaction to the invitation "Why don't we go?", such as replying "I don't want to go" or stop walking, for example, the line with the ID "SL1-05" is uttered.

Referring to the table 303 illustrated in FIG. 16, the line with the ID "SL1-04" is "I'm going ahead, I will wait under the stairs. (sound of running away)". Such a line is uttered with the sound of running away.

Referring to the table 303 illustrated in FIG. 16, the line with the ID "SL1-05" is "My old friend may be under the stairs". Such a line is uttered.

Both the lines are considered to invite the user down the stairs. Since the final destination is located below the stairs, the line is uttered to make the user go to that direction. Note that, if no response is obtained, for example, if a clear instruction such as "Let's go" is not received from the user for a predetermined time, in this case, for 20 seconds, the line with the ID "SL1-04" is uttered.

With utterance of such a line, when the user moves down the stairs (final destination), the line with the ID "SL1-06" is uttered.

Referring to the table 303 illustrated in FIG. 16, the line with the ID "SL1-06" is "I enjoyed eating here and riding on vehicles with my old friend. Why don't you eat something?" Such a line is uttered.

In response to this invitation, in a case where the user makes an utterance indicating an agreement such as "I'll eat", for example, the line with the ID "SL1-07" is uttered. Referring to the table 303 illustrated in FIG. 16, the line with the ID "SL1-07" is "OK. Enjoy your meal. I will be good while sniffing a delicious smell". Such a line is uttered.

On the other hand, in response to this question, in a case where the user makes an utterance indicating a disagreement such as "I'll not eat", the line with the ID "SL1-08" is uttered. Referring to the table 303 illustrated in FIG. 16, the line with the ID "SL1-08" is "OK. I love eating, but people are not always eating". Such a line is uttered.

Furthermore, in a case where the user does not reply for a predetermined time, for example, 20 seconds, the line with the ID "SL1-07" is uttered.

In the example illustrated here, in a case where the line with the ID "SL1-07" or the line with the ID "SL1-07" is uttered, it is determined that the SL quest has been cleared.

In this manner, one game is played. Since the game is to be performed by voice, the user can enjoy the game even while walking or running, unlike games with an image of a character displayed on the display screen.

Therefore, as described above, the user can enjoy the game of taking a walk in town.

In addition, as described above, in the game according to the present technology, the destination guidance information for guiding the user to the final destination can be provided by the help mode 102*a*-2, the help mode 102*b*-2, the hot/cold mode 102*b*-3, and the like, for example.

Further, the present location related information can be provided to the user at a spot (present location) where the user is walking by the play mode 102*a*-3, the GL quest mode 102*a*-4, and the like, for example.

Also, comments (information) can be provided to the user according to the time and place at which the user is walking, user's condition, and the like by the comment mode 102*a*-1, the comment mode 102*b*-1, and the like, for example.

Note that the embodiment has been described above taking the dialogues between the virtual character and the user such as comments as an example. Besides, sound effects showing the presence and action of the virtual character or the like can be presented to the user, for example. For example, the sounds of railroad crossings, animal calls or footsteps, the sounds of accessories worn by a virtual character, and others may be presented to the user.

Furthermore, background music (BGM) representing the virtual character and the user's situation may be presented to the user. For example, a fanfare when clearing a quest, BGM representing a serious scene, and the like may be presented to the user. In this manner, such sound communication can also be provided to the user in addition to the dialogues between the virtual character and the user.

Therefore, according to the game provided by the information processing device 1 described above, it is possible to provide the user with the information for guiding to the destination and also provide the user with the information regarding the place where the user is walking so that the user does not get tired before arriving at the destination. Consequently, it is possible to guide the user to the destination while entertaining the user, as compared with a case of simply guiding the user to the destination.

Furthermore, since the game proceeds in the form of dialogues with a virtual character, the user can feel a sense of intimacy with the virtual character. Thus, the user can move to the destination while enjoying a walk with the virtual character, as compared with a case where the device unilaterally provides the user with the information about the route to the destination.

Therefore, according to the game provided by the information processing device 1 described above, it is possible to entertain the user for a longer time, so that the user can enjoy searching a wide area with the information processing device 1.

<About a Recording Medium>

The above-described series of processes may be performed by hardware or software. In a case where the series of processes is performed by software, a program constituting the software is installed on a computer. Here, the computer includes a computer incorporated in dedicated hardware, a general-purpose personal computer, for example, that can execute various functions by installing various programs, and the like.

Figure 17:
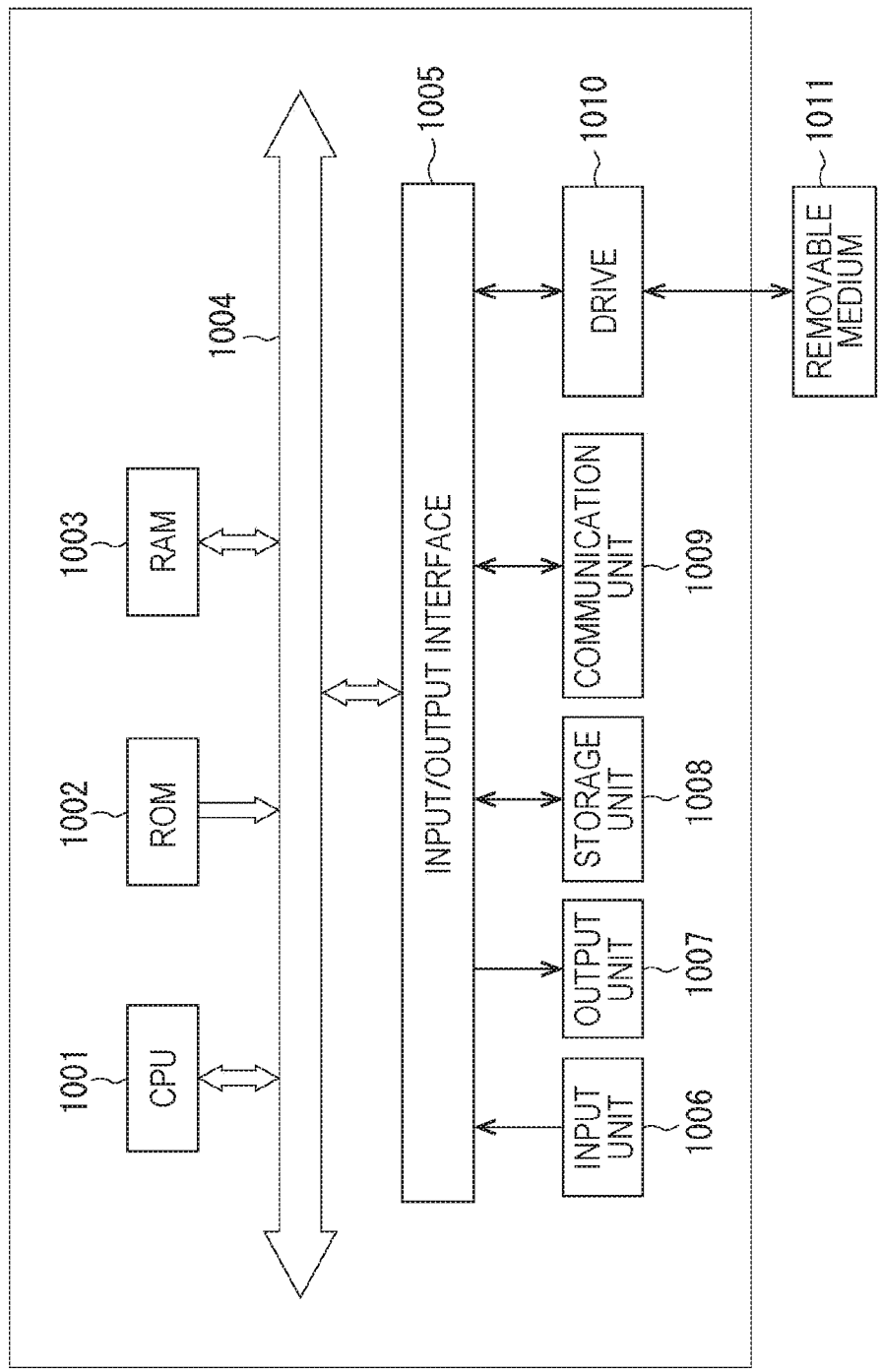
FIG. 17 is a diagram for describing a recording medium.

FIG. 17 is a block diagram illustrating an example of a hardware configuration of a computer that executes the series of processes described above according to programs. In the computer, a central processing unit (CPU) 1001, a read only memory (ROM) 1002, and a random access memory (RAM) 1003 are mutually connected by a bus 1004. An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The storage unit 1008 includes a hard disk, a non-volatile memory, and the like. The communication unit 1009 includes a network interface and the like. The drive 1010 drives a removable medium 1011 such as a magnetic disk, an optical disk, a magneto-optical disk, or a semiconductor memory.

In the computer configured as described above, for example, the CPU 1001 loads the programs from the storage unit 1008 into the RAM 1003 via the input/output interface 1005 and the bus 1004, and executes the programs to perform the series of processes described above.

The programs to be executed by the computer (CPU 1001) can be provided by being recorded on, for example, the removable medium 1011 as a package medium or the like. Furthermore, the programs can be provided via a wired or wireless transmission medium such as a local area network, the Internet, or digital satellite broadcasting.

In the computer, the programs can be installed in the storage unit 1008 via the input/output interface 1005 by inserting the removable medium 1011 into the drive 1010. Furthermore, the programs can be received by the communication unit 1009 via a wired or wireless transmission medium and installed in the storage unit 1008. In addition, the programs can be installed in advance in the ROM 1002 or the storage unit 1008.

Note that the programs to be executed by the computer may be programs by which processes are performed in a time-series manner according to the order described herein, or programs by which processes are performed in parallel or at necessary timings such as when a call is made.

Furthermore, the term "system" herein refers to the entire device configured by a plurality of devices.

Note that the advantageous effects described herein are mere examples but are not limited ones. The present technology may have any other advantageous effects.

Note that embodiments of the present technology are not limited to the foregoing embodiments but can be modified in various manners without deviating from the gist of the present technology.

Note that the present technology may be configured as described below.

(1)

An information processing device including a control unit configured to perform a control to provide destination guidance information for guiding to a destination in a form of voice communication with a user, and perform a control to provide present location related information regarding a present location until the user arrives at the destination according to the destination guidance information in the form of voice communication with the user.

(2)

The information processing device according to (1) in which the destination guidance information and the present location related information are provided as lines uttered by a virtual character.

(3)

The information processing device according to (1) or (2) in which the destination is an area where a quest is set.

(4)

The information processing device according to any one of (1) to (3) in which, as the destination guidance information, different information is provided according to a distance from the destination.

(5)

The information processing device according to any one of (1) to (4) in which, when the distance from the destination is short, information indicating characteristics of a surrounding environment of the destination is provided as the destination guidance information, and when the distance from the destination is long, specific information regarding the destination is provided as the destination guidance information.

(6)

The information processing device according to any one of (1) to (5) in which the destination guidance information is a line for notification of increasing proximity to the destination, a line for notification of decreasing proximity to the destination, a line for inviting to a left side, or a line for inviting to a right side.

(7)

The information processing device according to any one of (1) to (6) in which the present location related information is information regarding a quest set to a predetermined place, and is provided when the predetermined place is reached.

(8)

The information processing device according to (2) in which the present location related information is a line regarding memories set to the virtual character.

(9)

The information processing device according to (2) in which The present location related information is information regarding placing a toy of the virtual character or discovering a toy.

(10)

An information processing method including the steps of:

performing a control to provide destination guidance information for guiding to a destination in a form of voice communication with a user; and performing a control to provide present location related information regarding a present location until the user arrives at the destination according to the destination guidance information in the form of voice communication with the user.

(11)

A program for causing a computer to execute a process including the steps of:

performing a control to provide destination guidance information for guiding to a destination in a form of voice communication with a user; and performing a control to provide present location related information regarding a present location until the user arrives at the destination according to the destination guidance information in the form of voice communication with the user.

(12)

An information processing device including a control unit configured to perform a process while switching among an intro mode as a mode at start of a game, a walk mode in which to walk to the final destination, and an arrival mode in which to arrive at the final destination.

(13)

The information processing device according to (12) in which the intro mode includes an initial mode when the game is started for a first time and a mode when the game is started second and subsequent times, and the mode in which the game is started the second and subsequent times includes a mode in which all quests are finished.

(14)

The information processing device according to (12) or (13) in which the walk mode includes different modes according to a distance from the final destination.

(15)

The information processing device according to (14) in which, among the different modes of the walk mode, as a mode in which the distance from the final destination is long, one of a mode in which to provide information for traveling to the final destination, a mode in which to utter lines based on weather, time, and state of the user, a mode in which to play with the user, and a mode in which to provide a quest set to a predetermined place is set.

(16)

The information processing device according to (14) in which, among the different modes of the walk mode, as a mode in proximity to the final destination, one of a mode in which to provide information for traveling to the final destination, a mode in which to provide lines based on weather, time, and the state of the user, and a mode in which to provide information regarding whether or not the user is approaching the final destination is set.

(17)

The information processing device according to any one of (12) to (16) in which the arrival mode is a mode in which to provide a quest set to the final destination.

(18)

The information processing device according to any one of (12) to (17) in which the intro mode, the walk mode, and the arrival mode are modes in which lines of a virtual character is uttered.

(19)

An information processing method including the step of performing a process while switching among an intro mode as a mode at start of a game, a walk mode in which to walk to the final destination, and an arrival mode in which to arrive at the final destination.

(20)

A program for causing a computer to execute the step of performing a process while switching among an intro mode as a mode at start of a game, a walk mode in which to walk to the final destination, and an arrival mode in which to arrive at the final destination.

REFERENCE SIGNS LIST

1 Information processing device
10 Control unit
10a State/action detection unit
10b Virtual character action determination unit
10c Scenario update unit
10d Relative position calculation unit
10e Sound image localization part
10f Voice output control unit
10g Reproduction history/feedback storage control unit
11 Communication unit
12 Microphone
13 Camera
14 Nine-axis sensor
15 Speaker
16 Positioning unit
17 Storage unit
20 Virtual character
101 Intro mode
101a Initial mode
101b First welcome mode
101c Second welcome mode
102 Walk mode
102a First walk mode
102a-1 Comment mode
102a-2 Help mode
102a-3 Play mode
102a-4 GL quest mode
102b Second walk mode
102b-1 Comment mode
102b-2 Help mode
102b-3 Hot/cold mode
103 Arrival mode

The invention claimed is:

1. An information processing device comprising a control unit configured to:

perform a control to provide destination guidance information, for guiding a user to a destination, in a form of voice communication of a virtual character;

determine a virtual action of the virtual character based on an action of the user;

determine a relative three-dimensional position where to localize a sound source based on the virtual action of the virtual character;

perform a control to localize the sound source based on the determined relative three-dimensional position; and perform a control to provide present location related information regarding a present location, until the user arrives at the destination according to the destination guidance information, in the form of the voice communication from the sound source.

2. The information processing device according to claim 1, wherein the destination guidance information and the present location related information are provided as lines uttered by the virtual character.

3. The information processing device according to claim 2, wherein the present location related information is a line regarding memories set to the virtual character.

4. The information processing device according to claim 2, wherein the present location related information is information regarding placing a toy of the virtual character or discovering another toy.

5. The information processing device according to claim 1, wherein, as the destination guidance information, different information is provided according to a distance from the destination.

6. The information processing device according to claim 1, wherein, based on a distance from the destination being short, information indicating characteristics of a surrounding environment of the destination is provided as the destination guidance information, and based on the distance from the destination being long, specific information regarding the destination is provided as the destination guidance information.

7. The information processing device according to claim 1, wherein the destination guidance information is a line for notification of increasing proximity to the destination, a line for notification of decreasing proximity to the destination, a line for inviting to a left side, or a line for inviting to a right side.

8. The information processing device according to claim 1, wherein the present location related information is information regarding a quest set to a predetermined place, and is provided when the predetermined place is reached.

9. The information processing device according to claim 1, wherein the action of the user is based on a state of the user, and wherein the state of the user is information regarding a position, a movement speed, an orientation, and a height of ear or head of the user.

10. An information processing method comprising the steps of:

performing a control to provide destination guidance information, for guiding a user to a destination, in a form of voice communication of a virtual character;

determining a virtual action of the virtual character based on an action of the user;

determining a relative three-dimensional position where to localize a sound source based on the virtual action of the virtual character;

performing a control to localize the sound source based on the determined relative three-dimensional position; and performing a control to provide present location related information regarding a present location, until the user arrives at the destination according to the destination guidance information, in the form of the voice communication from the sound source.

11. A non-transitory computer-readable medium, having stored thereon, computer-executable instructions that, when executed by a computer, cause the computer to execute a process comprising the steps of:

performing a control to provide destination guidance information, for guiding a user to a destination, in a form of voice communication of a virtual character;

determining a virtual action of the virtual character based on an action of the user;

determining a relative three-dimensional position where to localize a sound source based on the virtual action of the virtual character;

performing a control to localize the sound source based on the determined relative three-dimensional position; and performing a control to provide present location related information regarding a present location, until the user arrives at the destination according to the destination guidance information, in the form of the voice communication from the sound source.

* * * * *